United States Patent
Renz et al.

(10) Patent No.: US 6,191,199 B1
(45) Date of Patent: Feb. 20, 2001

(54) STABILIZED ADHESIVE COMPOSITIONS CONTAINING HIGHLY SOLUBLE, HIGH EXTINCTION PHOTOSTABLE HYDROXYPHENYL-S-TRIAZINE UV ABSORBERS AND LAMINATED ARTICLES DERIVED THEREFROM

(75) Inventors: Walter Renz, Brookfield, CT (US); Mervin Gale Wood, Jr., Poughquag, NY (US); Joseph Suhadolnik, Yorktown Heights, NY (US); Ramanathan Ravichandran, Nanuet, NY (US); Revathi Iyengar, Courtland Manor, NY (US)

(73) Assignee: Ciba Speciatly Chemicals Corporation, Tarrytown, NY (US)

( * ) Notice: Under 35 U.S.C. 154(b), the term of this patent shall be extended for 0 days.

(21) Appl. No.: 09/303,581

(22) Filed: May 3, 1999

(51) Int. Cl.$^7$ ....................................................... C08K 5/34
(52) U.S. Cl. .......................... 524/100; 524/101; 524/102; 524/103
(58) Field of Search .................................. 524/100, 101, 524/102, 103

(56) References Cited

U.S. PATENT DOCUMENTS 5,189,084 * 2/1993 Birbaum et al. ...................... 524/100
5,844,026 * 12/1998 Galbo et al. .......................... 524/100

* cited by examiner

*Primary Examiner*—Edward J. Cain
(74) *Attorney, Agent, or Firm*—Luther A. R. Hall

(57) ABSTRACT

Adhesive compositions are rendered stable against degradation caused by ultraviolet light through the incorporation of a highly soluble, high extinction, photostable hydroxyphenyl-s-triazine UV absorber. An example of such compounds is 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups). Such compounds exhibit high extinction, excellent photostability and are highly soluble in adhesive formulations. The laminated articles derived from these compositions include, for example, solar control films, films and glazings, UV absorbing glasses and glass coatings, windscreens, retroreflective sheetings and signs, solar reflectors, optical films and the like.

23 Claims, No Drawings

STABILIZED ADHESIVE COMPOSITIONS CONTAINING HIGHLY SOLUBLE, HIGH EXTINCTION PHOTOSTABLE HYDROXYPHENYL-S-TRIAZINE UV ABSORBERS AND LAMINATED ARTICLES DERIVED THEREFROM

This invention pertains to stabilized adhesive compositions containing an effective amount of a s-triazine UV absorber such as 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups) having very high molar extinction values, enhanced solubility and excellent photostability.

BACKGROUND OF THE INVENTION

Adhesives are made up of various components such as polymers, tackifiers, waxes and oils. Adhesive formulations based on these ingredients are susceptible to degradation. The consequences of degradation are discoloration, loss of elongation, loss of tensile strength, loss of tack and change in viscosity, molecular weight and molecular weight distribution. Degradation can be caused by prolonged exposure to sunlight. Sunlight contains invisible ultraviolet (UV) radiation with wavelengths between 290 and 400 nm. This radiation is responsible for the initiation of photodegradation.

Absorption of UV light by chromophores present in the adhesive formulation transforms the chromophores into their excited states which can undergo further undesired reactions. Some polymers contain strongly absorbing chromophores as a major part of their structures. Other polymers contain unintentional impurities such as ketones and hydroperoxide moieties and catalyst residues which act as chromophores. Absorption of UV radiation by these chromophores eventually results in bond cleavage, chain scission and/or crosslinking reactions.

Photostabilization of adhesives can be achieved by the addition of UV absorbers which convert the absorbed energy into harmless heat. An ideal UV absorber should be extremely photostable and have increased absorption over the UV range from 290 to 400 nm, but particularly the range of 350 to 400 nm. Classes of UV absorbers include the salicylates, cyanoacrylates, malonates, oxanilides, benzophenones, s-triazines and benzotriazoles.

Salicylates, cyanoacrylates, malonates and oxanilides absorb UV light primarily at the lower wavelengths of the UV range. These compounds have little to no absorption in the range of 350 to 400 nm which make them unsuitable for the instant applications. Benzophenones absorb over the lower half of the UV range, and they tend to be prone to yellowing upon light exposure due to photodegradation. Recently, it has been shown photochemically that benzophenones decompose prematurely in ethylene-vinyl acetate encapsulants which lead to the production of polyenic chromophores. This color generation from light yellow to brown is not only highly undesirable and unsightly in adhesive systems, but also can results in a loss of adhesive properties. By contrast, selected s-triazine UV absorbers are particularly useful because of their increased photostability.

Some polymers such as polycarbonates, polyesters and aromatic polyurethanes contain strongly absorbing chromophores as a major and integral part of their structures. Poly(ethylene terephthalate) (PET) and poly(ethylene 2,6-naphthalenedicarboxylate) (PEN) are particular examples the latter of which absorbs into the red UV region and especially need red-shifted s-triazines for UV protection. Adding an adhesive UV screening layer containing the s-triazines especially those described in the instant invention, further protects such polymers in multilayered constructions and articles.

The description, preparation and uses of the s-triazine UV absorbers are described for automotive coatings, photographic application, polymeric film coatings and ink jet printing. Automotive coatings are described in British 2,317,174A and 2,317,893A and in U.S. Pat. Nos. 5,556,973; 5,681,955; 5,726,309 and 5,106,891. Photographic applications are disclosed in U.S. Pat. No. 3,843,371 and copending application Ser. No. 08/974,263. Polymeric film coatings are described in U.S. Pat. Nos. 4,619,956 and 4,740,542. Ink jet printing is disclosed in U.S. Pat. No. 5,096,489. From each of these patents, the s-triazines UV absorbers are revealed as very photostable.

The s-triazine UV absorbers can be prepared by the general synthetic procedures outlined in U.S. Pat. Nos. 5,726,309; 5,681,955 and 5,556,973; British 2,317,714A and WO 96/28431.

The use of UV absorbers in adhesives is known as well. U.S. Pat. Nos. 5,683,804; 5,387,458; 5,618,626 and 5,643,676 demonstrate the use of UV absorbers in the adhesive layers of various articles. Typically benzophenones, cyanoacrylates, benzotriazoles and salicylates are used. The benzophenones, cyanoacrylates and salicylates do not provide acceptable performance in these applications. The benzotriazoles lack the high molar extinction values exhibited by the instant s-triazine UV absorbers. Quite surprisingly, the instant s-triazines are amazingly soluble in the adhesives making them especially well-suited for use in these applications. The use of s-triazine UV absorbers in adhesive compositions is not known in the prior art.

It is known in the art that the concomitant use of a hindered amine light stabilizer with a UV absorber such as an s-triazine provides excellent stabilization in many polymer compositions as summarized by G. Berner and M. Rembold, "New Light Stabilizers for High Solids Coatings", Organic Coatings and Science and Technology, Vol. 6, Dekkar, N.Y., pp 55–85.

Molecules containing both a UV absorber moiety and a hindered amine moiety with N—H, N-alkyl, N-alkanoyl and N-hydrocarbyloxy derivatives are described in U.S. Pat. Nos. 4,289,686; 4,344,876; 4,426,471; 4,314,933; 4,481,315; 4,619,956 and 5,021,478; British 2,188,631; and L. Awar et al., "New Anti-UV Stabilizers for Automotive Coatings: (presented at the 1988 Annual Meeting of the Federation oif Societies for Coatings Technology).

The concomitant use of a separate hindered amine molecule and a separate UV absorber is also taught in U.S. Pat. No. 4,619,956.

U.S. Pat. No. 5,204,390 teaches pressure-sensitive, hot melt adhesives for application to plasticized surfaces. It is generically taught that benzotriazoles and 1,3,5-tris(2-hydroxyphenyl)-s-triazine might be used in such products.

The effect of UV light on laminated articles that are exposed to the sun or other sources of UV light are of great concern to the manufacturers of such articles. Over time, constant or repeated exposure to UV light can result in dye and/or pigment fade for dyes and/or pigments used in such articles and in the degradation or breakdown of the adhesives, polymers or other materials used in the construction of the articles. The aforementioned fading and degradation shorten the useful life of the articles in question, making protection from UV light exposure an issue of great importance to the manufacturers of such articles.

Molecules known as UV absorbers are generally known in the art. However, due to the differences discussed above between the various UV absorber classes, it is the s-triazines and articles containing them which will be discussed here. Due to the incompatibility and low solubility of certain UV absorbers, a need exists for a s-triazine UV absorber that is highly soluble and which is very photostable and with a high molar extinction value.

T. Nagashima and H. Kuramashi, J. Non-Cryst. Solids, 178, (1994), 182 report "Recently ultraviolet light (UV) shielding glass, which is UV absorbing over the range of long wavelengths (320–400 nm) to avoid sunburn effects, has become an important issue because of the possible hazard of skin cancer due to depletion of the ozone layer."

The use of s-triazine UV absorbers in adhesive compositions and articles addresses these concerns and is not known in the prior art. In addition, articles which incorporate the s-triazine UV absorber of the instant invention are useful in protecting interior textiles and fabrics from UV induced photodegradation.

U.S. Pat. No. 5,770,114 discloses stabilized compositions containing soluble benzotriazoles that are used in electrochromic devices. This patent discloses that 2-(2-hydroxy-5-methylphenyl)-2H-benzotriazole is effective in stabilizing such electrochromic devices against degradation from UV radiation, but that it is not soluble enough in aprotic solvents, e.g. propylene carbonate, to provide suitable protection for electrochromic devices for very long periods of time. This indicates that any acceptable UV absorber must also exhibit excellent solubility in substrates and solvents in order to be acceptable.

Articles which would benefit from the incorporation of the instant, highly soluble, high extinction and photostable s-triazine include, but are not limited to:

(a) Retroreflective Sheets and Signs and Conformable Marketing Sheets as seen in WO 97/42261; and U.S. Pat. No. 5,387,458 which is incorporated herein by reference;

(b) Solar Control Films of Various Construction as seen in British 2,012,668; European 355,962; and U.S. Pat. Nos. 3,290,203; 3,681,179; 3,776,805 and 4,095,013 which are incorporated herein by reference;

(c) Corrosion Resistant Silver Mirrors and Solar Reflectors as seen in U.S. Pat. No. 4,645,714 which is incorporated herein by reference;

(d) Reflective Print Labels as seen in U.S. Pat. No. 5,564,843 which is incorporated herein by reference;

(e) UV Absorbing Glasses and Glass Coatings as seen in U.S. Pat. Nos. 5,372,889; 5,426,204; 5,683,804 and 5,618,626 which are incorporated herein by reference;

(f) Electrochromic Devices as seen in European 752,612 A1; and U.S. Pat. Nos. 5,239,406; 5,523,877 and 5,770,114 which are incorporated herein by reference;

(g) Films/Glazings as seen in WO 92/01557; Japanese Nos. 75-33286; 93-143668; 95-3217 and 96-143831; and U.S. Pat. No. 5,643,676 which is incorporated herein by reference;

(h) Windscreens and Intermediate Layers as seen in Japanese Nos. 80-40018; 90-192118; 90-335037; 90-335038; 92-110128 and 94-127591; and U.S. Pat. No. 5,618,863 which is incorporated herein by reference; and (i) Optical Films as seen in WO 97/32225; and U.S. Pat. Nos. 4,871,784 and 5,217,794 which are incorporated herein by reference.

DETAILED DISCLOSURE

The general embodiment of the instant invention is to a stabilized adhesive composition, suitable for use as an adhesive layer in a laminated article or multilayer construction, which comprises (a) an adhesive; and (b) an effective stabilizing amount of a highly soluble, high molar extinction and photostable s-triazine UV absorber of formula I, II, III, IV, V, or VI

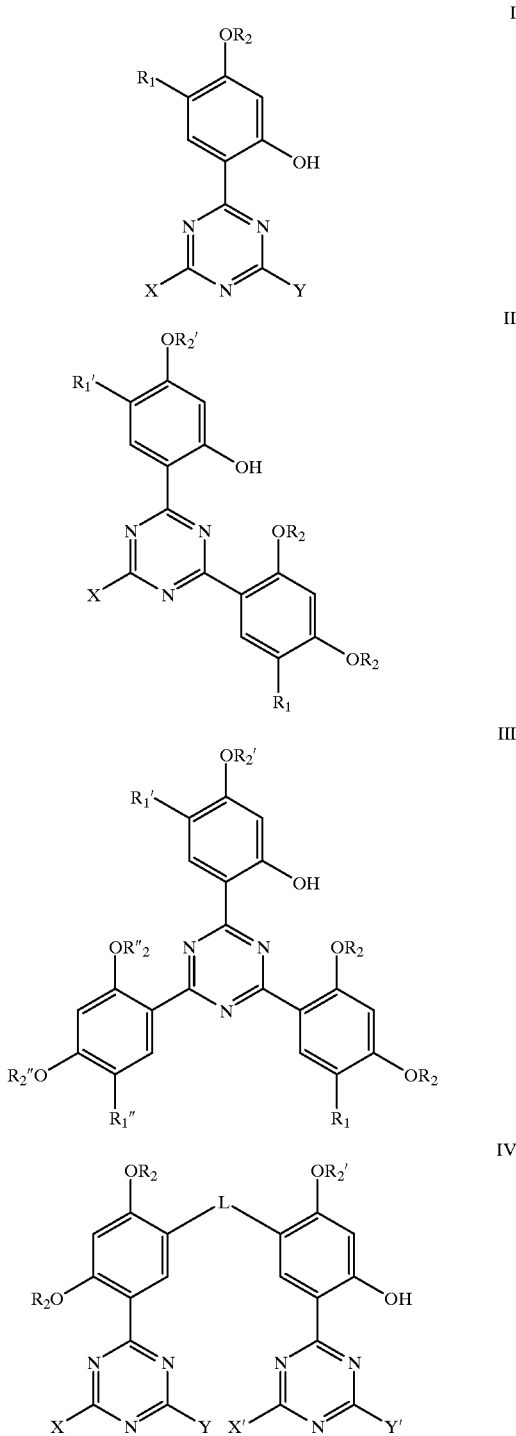

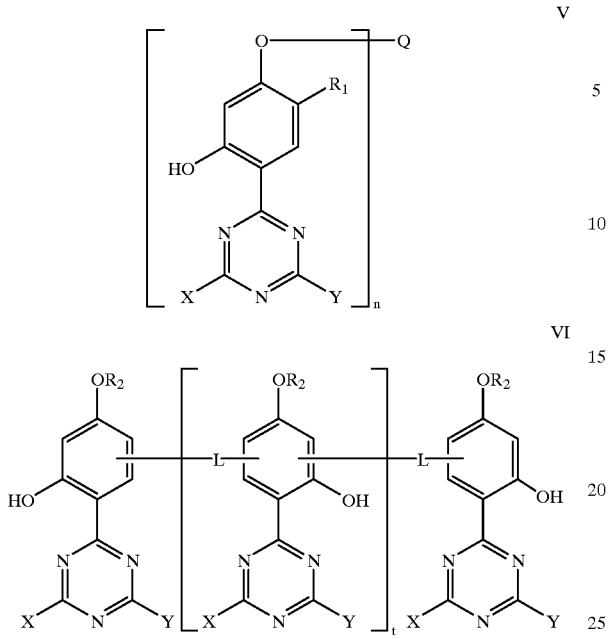

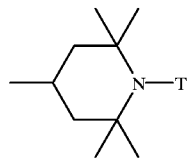

wherein
- X and Y are independently phenyl, naphthyl, or said phenyl or said naphthyl substituted by one to three alkyl of 1 to 6 carbon atoms, by halogen, by hydroxy or by alkoxy of 1 to 6 carbon atoms or by mixtures thereof; or X and Y are independently $Z_1$ or $Z_2$;
- $R_1$ is hydrogen, straight or branched chain alkyl of 1 to 24 carbon atoms, cycloalkyl of 5 to 12 carbon atoms, phenylalkyl of 7 to 15 carbon atoms, halogen, —$SR_3$, —$SOR_3$ or —$SO_2R_3$; or said alkyl, said cycloalkyl or said phenylalkyl substituted by one to three halogen, —$R_4$, —$OR_5$, —$N(R_5)_2$, —$COR_5$, —$COOR_5$, —$OCOR_5$, —CN, —$NO_2$, —$SR_5$, —$SOR_5$, —$SO_2R_5$ or —$P(O)(OR_5)_2$, morpholinyl, piperidinyl, 2,2,6,6-tetramethylpiperidinyl, piperazinyl or N-methylpiperidinyl groups or combinations thereof; or said alkyl or said cycloalkyl interrupted by one to four phenylene, —O—, —$NR_5$—, —$CONR_5$—, —COO—, —OCO— or —CO groups or combinations thereof; or said alkyl or said cycloalkyl both substituted and interrupted by combinations of the groups mentioned above;
- $R_3$ is alkyl of 1 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms;
- $R_4$ is aryl of 6 to 10 carbon atoms or said aryl substituted by one to three halogen, alkyl of 1 to 8 carbon atoms, alkoxy of 1 to 8 carbon atoms or combinations thereof; cycloalkyl of 5 to 12 carbon atoms; phenylalkyl of 7 to 15 carbon atoms or said phenylalkyl substituted on the phenyl ring by one to three halogen, alkyl of 1 to 8 carbon atoms, alkoxy of 1 to 8 carbon atoms or combinations thereof; or straight or branched chain alkenyl of 2 to 18 carbon atoms;
- $R_5$ is defined as is $R_4$; or $R_5$ is also hydrogen or straight or branched chain alkyl of 1 to 24 carbon atoms, alkenyl of 2 to 24 carbon atoms; or $R_5$ is a group for formula

- T is hydrogen, oxyl, hydroxyl, —$OT_1$, alkyl of 1 to 24 carbon atoms, said alkyl substituted by one to three hydroxy; benzyl or alkanoyl of 2 to 18 carbon atoms;
- $T_1$ is alkyl of 1 to 24 carbon atoms, cycloalkyl of 5 to 12 carbon atoms, alkenyl of 2 to 24 carbon atoms, cycloalkenyl of 5 to 12 carbon atoms, phenylalkyl of 7 to 15 carbon atoms, a radical of a saturated or unsaturated bicyclic or tricyclic hydrocarbon of 7 to 12 carbon atoms or aryl of 6 o 10 carbon atoms or said aryl substituted by one to three alkyl of 1 to 4 carbon atoms;
- $R_2$ is hydrogen, straight or branched chain alkyl of 1 to 24 carbon atoms or cycloalkyl of 5 to 12 carbon atoms; or said alkyl or said cycloalkyl substitute by one to four halogen, epoxy, glycidyloxy, furyloxy, —$R_4$, —$OR_5$, —$N(R_5)_2$, —$CON(R_5)_2$, —$COR_5$, —$COOR_5$, —$OCOR_5$, —$OCOC(R_5)$=$C(R_5)_2$, —$C(R_5)$=$CCOOR_5$, —CN, —NCO, or

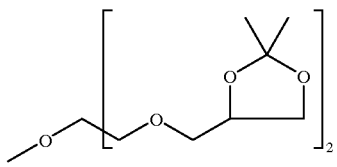

or combinations thereof; or said alkyl or said cycloalkyl interrupted by one to four epoxy, —O—, —$NR_5$—, —$CONR_5$—, —COO—, —OCO—, —CO—, —$C(R_5)$=$C(R_5)COO$—, —$OCOC(R_5)$=$C(R_5)$—, —$C(R_5)$=$C(R_5)$—, phenylene or phenylene-G-phenylene in which G is —O—, —S—, —$SO_2$—, —$CH_2$— or —$C(CH_3)_2$— or combinations thereof, or said alkyl or said cycloalkyl both substituted and interrupted by combinations of the groups mentioned above; or $R_2$ is —$SO_2R_3$ or —$COR_6$;
- $R_6$ is straight or branched chain alkyl of 1 to 18 carbon atoms, straight or branched chain alkenyl of 2 to 12 carbon atoms, phenoxy, alkylamino of 1 to 12 carbon atoms, arylamino of 6 to 12 carbon atoms, —$R_7COOH$ or —NH—$R_8$—NCO;
- $R_7$ is alkylene of 2 to 14 carbon atoms or phenylene;
- $R_8$ is alkylene of 2 to 24 carbon atoms, phenylene, tolylene, diphenylmethane or a group

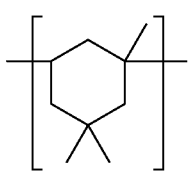

- $R_1$, $R_1'$ and $R_1''$ are the same or different and are as defined for $R_1$;
- $R_2$, $R_2'$ and $R_2''$ are the same or different and are as defined for $R_2$;

X, X', Y and Y' are the same or different and are as defined for X and Y;

t is 0 to 9;

L is straight or branched alkylene of 1 to 12 carbon atoms, cycloalkylene of 5 to 12 carbon atoms or alkylene substituted or interrupted by cyclohexylene or phenylene; or L is benzylidene; or L is —S—, —S—S—, —S—E—S—, —SO—, —SO$_2$—, —SO—E—SO—, —SO$_2$—E—SO$_2$—, —CH$_2$—NH—E—NH—CH$_2$— or

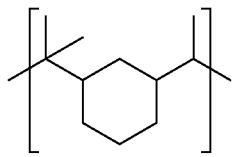

E is alkylene of 2 to 12 carbon atoms, cycloalkylene of 5 to 12 carbon atoms or alkylene interrupted or terminated by cycloalkylene of 5 to 12 carbon atoms;

n is 2, 3 or 4;

when n is 2; Q is straight or branched alkylene of 2 to 16 carbon atoms; or said alkylene substituted by one to three hydroxy groups; or said alkylene interrupted by one to three —CH=CH— or —O—; or said alkylene both substituted and interrupted by combinations of the groups mentioned above; or Q is xylylene or a group —CONH—R$_8$—NHCO—, —CH$_2$CH(OH)CH$_2$O—R$_9$—OCH$_2$CH(OH)CH$_2$—, —CO—R$_{10}$—CO—, or —(CH$_2$)$_m$—COO—R$_{11}$—OOC—(CH$_2$)$_m$—, where m is 1 to 3; or Q is

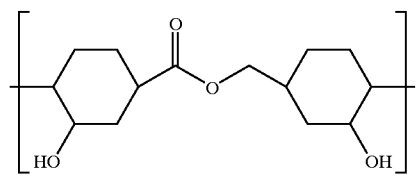

R$_9$ is alkylene of 2 to 50 carbon atoms; or said alkylene interrupted by one to ten —O—, phenylene or a group -phenylene-G-phenylene in which G is —O—, —S—, —SO$_2$—, —CH$_2$— or —C(CH$_3$)$_2$—;

R$_{10}$ is alkylene of 2 to 10 carbon atoms, or said alkylene interrupted by one to four —O—, —S— or —CH=CH—; or R$_{10}$ is arylene of 6 to 12 carbon atoms;

R$_{11}$ is alkylene of 2 to 20 carbon atoms or said alkylene interrupted by one to eight —O—;

when n is 3, Q is a group —[(CH$_2$)$_m$COO]$_3$—R$_{12}$ where m is 1 to 3, and R$_{12}$ is an alkanetriyl of 3 to 12 carbon atoms;

when n is 4, Q is a group —[(CH$_2$)$_m$COO]$_4$—R$_{13}$ where m is 1 to 3, and R$_{14}$ is an alkanetetrayl of 4 to 12 carbon atoms;

Z$_1$ is a group of formula

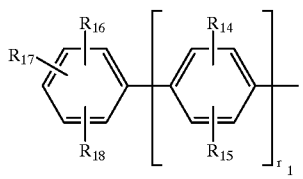

Z$_2$ is a group of formula

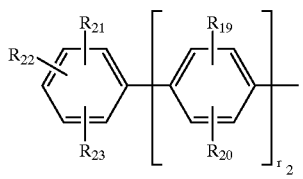

where r$_1$ and r$_2$ are independently of each other 0 or 1;

R$_{14}$, R$_{15}$, R$_{16}$, R$_{17}$, R$_{18}$, R$_{19}$, R$_{20}$, R$_{21}$, R$_{22}$ and R$_{23}$ are independently of one another hydrogen, hydroxy, cyano, alkyl of 1 to 20 carbon atoms, alkoxy of 1 to 20 carbon atoms, phenylalkyl of 7 to 15 carbon atoms, cycloalkyl of 5 to 12 carbon atoms, cycloalkoxy of 5 to 12 carbon atoms, halogen, haloalkyl of 1 to 5 carbon atoms, sulfo, carboxy, acylamino of 2 to 12 carbon atoms, acyloxy of 2 to 12 carbon atoms, alkoxycarbonyl of 2 to 12 carbon atoms or aminocarbonyl; or R$_{17}$ and R$_{18}$ or R$_{22}$ and R$_{23}$ together with the phenyl radical to which they are attached are a cyclic radical interrupted by one to three —O— or —NR$_5$—; and with the proviso that the s-triazine of formula I, II, III, IV, V or VI exhibits enhanced durability and low loss of absorbance when exposed to actinic radiation as witnessed by an absorbance loss of less than 0.5 absorbance units after exposure for 1050 hours or less than 0.7 absorbance units after exposure for 1338 hours in a Xenon Arc Weather-Ometer.

Preferably, the invention pertains to compounds of formula I where X and Y are the same or different and are phenyl or said phenyl substituted by one to three alkyl of 1 to 6 carbon atoms, halogen, hydroxy or alkoxy of 1 to 12 carbon atoms; or Z$_1$ or Z$_2$;

R$_1$ is hydrogen, straight or branched chain alkyl of 1 to 24 carbon atoms, cycloalkyl of 5 to 12 carbon atoms, phenylalkyl of 7 to 15 carbon atoms or halogen;

R$_2$ is hydrogen, straight or branched chain alkyl of 1 to 24 carbon atoms or cycloalkyl of 5 to 12 carbon atoms; or said alkyl or said cycloalkyl substituted by one to three —R$_4$, —OR$_5$, —COOR$_5$, —OCOR$_5$ or combinations thereof; or said alkyl or cycloalkyl interrupted by one to three epoxy, —O—, —COO—, —OCO— or —CO—;

R$_4$ is aryl of 6 to 10 carbon atoms or said aryl substituted by one to three halogen, alkyl of 1 to 8 carbon atoms, alkoxy of 1 to 8 carbon atoms or combinations thereof; cycloalkyl of 5 to 12 carbon atoms; phenylalkyl of 7 to 15 carbon atoms or said phenylalkyl substituted on the phenyl ring by one to three halogen, alkyl of 1 to 8 carbon atoms, alkoxy of 1 to 8 carbon atoms or combinations thereof;

R$_5$ is defined as is R$_4$; or R$_5$ is also hydrogen or straight or branched chain alkyl of 1 to 24 carbon atoms;

$Z_1$ is a group of formula

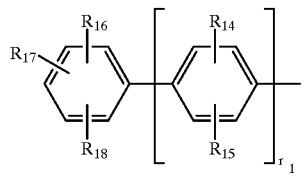

$Z_2$ is a group of formula

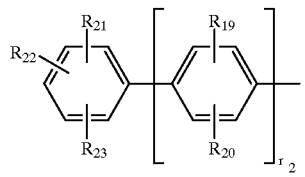

where $r_1$, and $r_2$ are each 1; and $R_{14}$, $R_{15}$, $R_{16}$, $R_{17}$, $R_{18}$, $R_{19}$, $R_{20}$, $R_{21}$, $R_{22}$ and $R_{23}$ are independently of one another hydrogen, hydroxy, cyano, alkyl of 1 to 20 carbon atoms, alkoxy of 1 to 20 carbon atoms, phenylalkyl of 7 to 15 carbon atoms, cycloalkyl of 5 to 12 carbon atoms, cycloalkoxy of 5 to 12 carbon atoms, halogen, haloalkyl of 1 to 5 carbon atoms, sulfo, carboxy, acylamino of 2 to 12 carbon atoms, acyloxy of 2 to 12 carbon atoms, or alkoxycarbonyl of 2 to 12 carbon atoms or aminocarbonyl.

Preferably, the s-triazine UV absorber is also of formula II where

X is phenyl, naphthyl or said phenyl or said naphthyl substituted by one to three alkyl of 1 to 6 carbon atoms, by halogen, by hydroxy or by alkoxy of 1 to 6 carbon atoms or by mixtures thereof; or X is $Z_1$;

$R_1$ and $R_1'$ are independently as defined for $R_1$;

$R_2$ and $R_2'$ are independently as defined for $R_2$.

Preferably, the s-triazine UV absorber is also of formula III where $R_1$, $R_1'$ and $R_1''$ are independently as defined for $R_1$;

$R_2$, $R_2'$ and $R_2''$ are independently as defined for $R_2$.

Preferably, the s-triazine UV absorber is also of formula VI where

X and Y are independently phenyl or said phenyl substituted by one to three alkyl of 1 to 6 carbon atoms, by halogen, by hydroxy or by alkoxy of 1 to 6 carbon atoms or by mixtures thereof; or X and Y are independently $Z_1$ or $Z_2$; and L is straight or branched alkylene of 1 to 12 carbon atoms, cycloalkylene of 5 to 12 carbon atoms or alkylene substituted or interrupted by cyclohexylene or phenylene.

Most preferably, the instant s-triazine UV absorber is of formula I where X and Y are the same or different and are phenyl or said phenyl substituted by one to three alkyl of 1 to 6 carbon atoms; $Z_1$ or $Z_2$;

$R_1$ is hydrogen or phenylalkyl of 7 to 15 carbon atoms;

$R_2$ is hydrogen, straight or branched chain alkyl of 1 to 18 carbon atoms; or said alkyl substituted by one to three —$R_4$, —$OR_5$ or mixtures thereof; or said alkyl interrupted by one to eight —O— or —COO—;

$R_4$ is aryl of 6 to 10 carbon atoms;

$R_5$ is hydrogen;

$Z_1$ is a group of formula

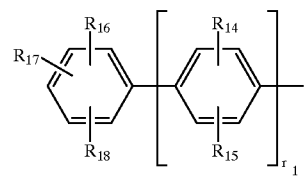

$Z_2$ is a group of formula

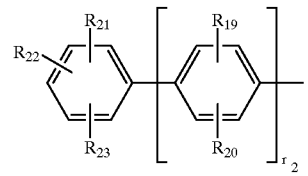

where $r_1$ and $r_2$ are each 1; and $R_{14}$, $R_{15}$, $R_{16}$, $R_{17}$, $R_{18}$, $R_{19}$, $R_{20}$, $R_{21}$, $R_{22}$ and $R_{23}$ are each hydrogen.

Preferably, the s-triazine UV absorber of this invention is a compound which is (1)

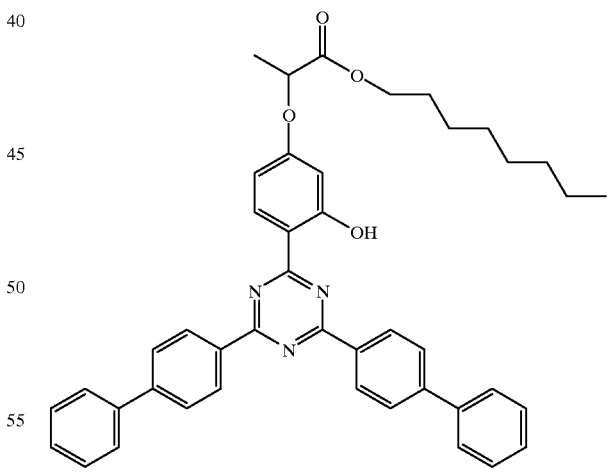

methylene bridged dimer mixture bridged in the 3:5', 5:5' and 3:3' positions in a 5:4:1 ratio

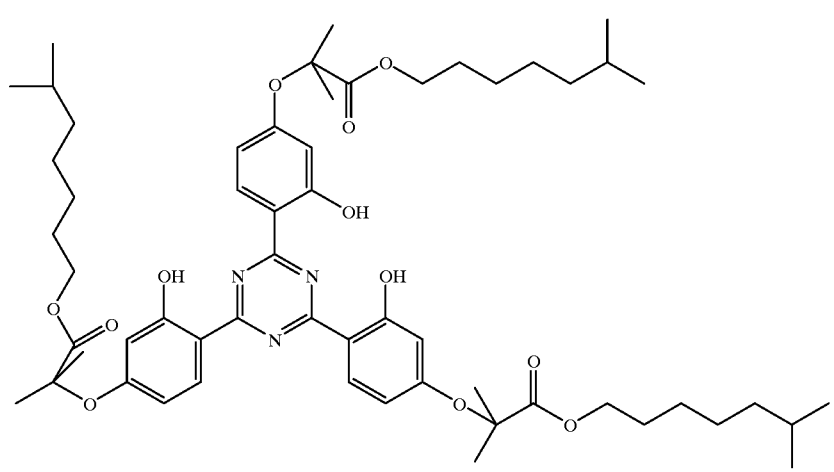
(7)
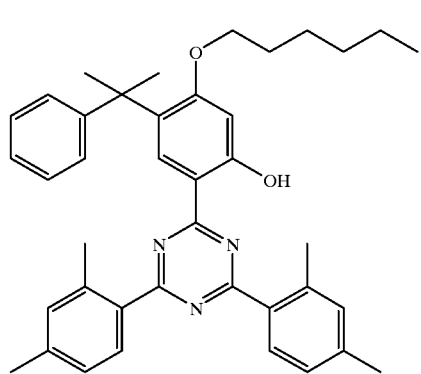
(8)
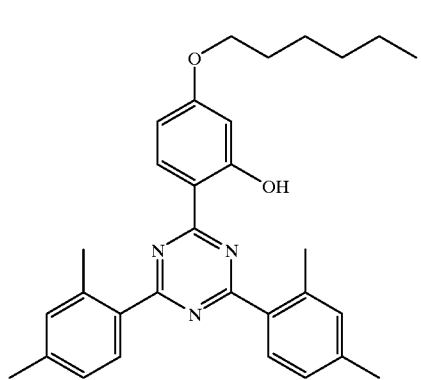
(9)

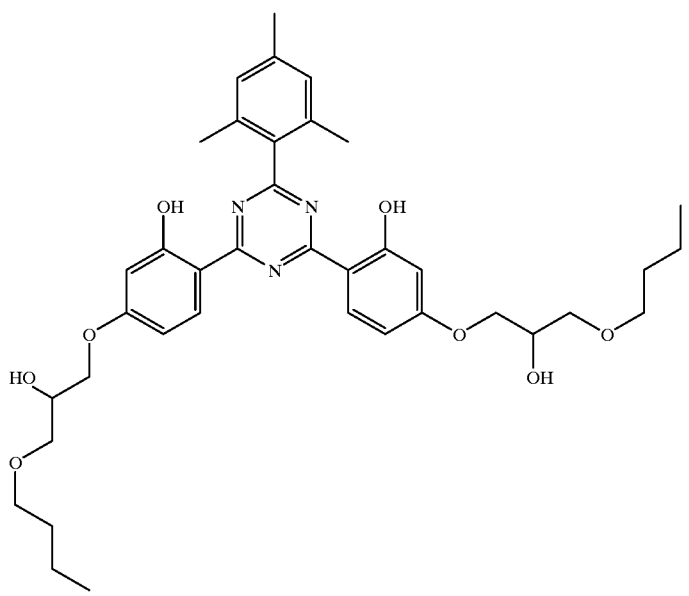

(10)

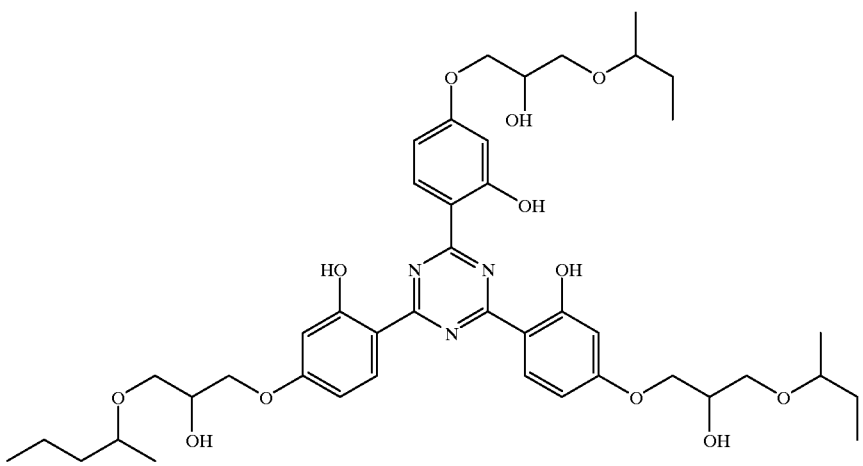

(11)

The names of the instant compounds illustrated in the structures given above as listed below as indicated.

(1) 2,4-bis(4-biphenylyl)-6-(2-hydroxy-4-octyloxycarbonylethylideneoxyphenyl)-s-triazine;
(2) 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine;
(3) 2,4-bis(2,4-dimethylphenyl)-6-[2-hydroxy-4-(3-benzyloxy-2-hydroxypropyloxy)phenyl]-s-triazine;
(4) 2,4-bis(2-hydroxy-4-n-butyloxyphenyl)-6-(2,4-di-n-butyloxyphenyl)-s-triazine;
(5) 2,4-bis(2,4-dimethylphenyl)-6-[2-hydroxy-4-(3-nonyloxy*-2-hydroxypropyloxy)-5-α-cumylphenyl]-s-triazine; (* denotes a mixture of octyloxy, nonyloxy and decyloxy groups)
(6) methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio;
(7) 2,4,6-tris(2-hydroxy-4-isooctyloxycarbonylisopropylideneoxyphenyl)-s-triazine;
(8) 2,4-bis(2,4-dimethylphenyl)-6-(2-hydroxy-4-hexyloxy-5-α-cumylphenyl)-s-triazine;
(9) 2,4-bis(2,4-dimethylphenyl)-6-(2-hydroxy-4-octyloxyphenyl)-s-triazine, CYASORB® 1164, Cytec;
(10) 2-(2,4,6-trimethylphenyl)-4,6-bis[2-hydroxy-4-(3-butyloxy-2-hydroxypropyloxy)-phenyl]-s-triazine; or
(11) 2,4,6-tris[2-hydroxy-4-(3-sec-butyloxy-2-hydroxypropyloxy)phenyl]-s-triazine.

Preferably, the s-triazine UV absorber of component (b) is (1) 2,4-bis(4-biphenylyl)-6-(2-hydroxy-4-octyloxycarbonylethylideneoxyphenyl)-s-triazine;
(5) 2,4-bis(2,4-dimethylphenyl)-6-[2-hydroxy-4-(3-nonyloxy*-2-hydroxypropyloxy)-5-α-cumylphenyl]-s-triazine; (* denotes a mixture of octyloxy, nonyloxy and decyloxy groups) or
(7) 2,4,6-tris(2-hydroxy-4-isooctyloxycarbonylisopropylideneoxyphenyl)-s-triazine.

More particularly, the adhesive of component (a) is selected from the group consisting of the pressure sensitive adhesives, the rubber-based adhesives, the solvent or emulsion based adhesives, the hot melt adhesives and natural-product based adhesives. These adhesives are selected from the group consisting of the polyurethanes, polyacrylics, epoxys, phenolics, polyimides, poly(vinyl butyral), polycyanoacrylates, polyacrylates, ethylene/acrylic acid copolymers and their salts (ionomers), silicon polymers, poly(ethylene/vinyl acetate), atatic polypropylene, styrene-diene copolymers, polyamides, hydroxyl-terminated polybutadiene, polychloroprene, poly(vinyl acetate), carboxylated styrene/butadiene copolymers and poly(vinyl alcohol).

The effective stabilizing amount of a s-triazine of component (b) of formula I, II, III, IV, V or VI is 0.1 to 20% by weight based on the adhesive.

The instant adhesive stabilized by a s-triazine of formula I, II, III, IV, V or VI may also optionally contain from 0.01 to 10% by weight; preferably from 0.025 to 5% by weight, and most preferably from 0.1 to 3% by weight of additional coadditives such as antioxidants, other UV absorbers, hindered amines, phosphites or phosphonites, hydroxylamines, nitrones, benzofuran-2-ones, thiosynergists, polyamide stabilizers, metal stearates, nucleating agents, fillers, reinforcing agents, lubricants, emulsifiers, dyes, pigments, optical brighteners, flame retardants, antistatic agents, blowing agents and the like.

The stabilizers of the instant invention may readily be incorporated into the adhesive compositions by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The resulting stabilized adhesive compositions of the invention may optionally also contain from about 0.01 to about 10%, preferably from about 0.025 to about 5%, and especially from about 0.1 to about 3% by weight of various conventional stabilizer coadditives, such as the materials listed below, or mixtures thereof.

1. Antioxidants
1.1. Alkylated monophenols, for example, 2,6-di-tert-butyl-4-methylphenol
2-tert-butyl-4,6-dimethylphenol
2,6-di-tert-butyl-4-ethylphenol
2,6-di-tert-butyl-4-n-butylphenol
2,6-di-tert-butyl-4-i-butylphenol
2,6-di-cyclopentyl-4-methylphenol
2-(α-methylcyclohexyl)-4,6-dimethylphenol
2,6-di-octadecyl-4-methylphenol
2,4,6-tri-cyclohexylphenol
2,6-di-tert-butyl-4-methoxymethylphenol 1.2. Alkylated hydroquinones, for example, 2,6-di-tert-butyl-4-methoxyphenol
2,5-di-tert-butyl-hydroquinone
2,5-di-tert-amyl-hydroquinone
2,6-diphenyl-4-octadecyloxyphenol 1.3. Hydroxylated thiodiphenyl ethers, for example, 2,2'-thio-bis-(6-tert-butyl-4-methylphenol)
2,2'-thio-bis-(4-octylphenol)
4,4'-thio-bis-(6-tert-butyl-3-methylphenol)
4,4'-thio-bis-(6-tert-butyl-2-methylphenol)

1.4. Alkylidene-bisphenols, for example, 2,2'-methylene-bis-(6-tert-butyl-4-methylphenol)
2,2'-methylene-bis-(6-tert-butyl-4-ethylphenol)
2,2'-methylene-bis-[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α, α-dimethylbenzyl)-4-nonylphenol]
2,2'-methylene-bis-(4,6-di-tert-butylphenol)
2,2'-ethylidene-bis-(4,6-di-tert-butylphenol)
2,2'-ethylidene-bis-(6-tert-butyl-4-isobutylphenol)
4,4'-methylene-bis-(2,6-di-tert-butylphenol)
4,4'-methylene-bis-(6-tert-butyl-2-methylphenol)
1,1-bis-(5-tert-butyl-4-hydroxy-2-methylphenyl)-butane
2,6-di-(3-tert-butyl-5-methyl-2-hydroxybenzyl)-4-methylphenol
1,1,3-tris-(5-tert-butyl-4-hydroxy-2-methylphenyl)-butane
1,1-bis-(5-tert-butyl-4-hydroxy-2-methylphenyl)-3-n-dodecylmercaptobutane
ethyleneglycol bis-[3,3-bis-(3'-tert-butyl-4'-hydroxyphenyl)-butyrate]
di-(3-tert-butyl-4-hydroxy-5-methylphenyl)-dicyclopentadiene
di-[2-(3'-tert-butyl-2'-hydroxy-5'-methyl-benzyl)-6-tert-butyl-4methylphenyl]terephthalate.

1.5. Benzyl compounds, for example, 1,3,5-tri-(3,5-di-tert-butyl-4-hydroxybenzyl)-2,4,6-trimethylbenzene
di-(3,5-di-tert-butyl-4-hydroxybenzyl)sulfide
3,5-di-tert-butyl-4-hydroxybenzyl-mercapto-acetic acid isooctyl ester
bis-(4-tert-butyl-3-hydroxy-2,6-dimethylbenzyl)dithiol terephthalate
1,3,5-tris-(3,5-di-tert-butyl-4-hydroxybenzyl)isocyanurate
1,3,5-tris-(4-tert-butyl-3-hydroxy-2,6-dimethylbenzyl) isocyanurate
3,5-di-tert-butyl-4-hydroxybenzyl-phosphoric acid dioctadecyl ester
3,5-di-tert-butyl-4-hydroxybenzyl-phosphoric acid monoethyl ester, calcium-salt 1.6. Acylaminophenols, for example, 4-hydroxy-lauric acid anilide
4-hydroxy-stearic acid anilide
2,4-bis-octylmercapto-6-(3,5-tert-butyl-4-hydroxyanilino)-s-triazine
octyl-N-(3,5-di-tert-butyl-4-hydroxyphenyl)-carbamate 1.7. Esters of β-(3,5-di-tert-butyl-4-hydroxyphenyl)-propionic acid with monohydric or polyhydric alcohols, for example,

| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |
| triethanolamine | triisopropanolamine |

1.8. Esters of β-(5-tert-butyl-4-hydroxy-3-methylphenyl)-propionic acid with monohydric or polyhydric alcohols, for example,

| | |
|---|---|
| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |
| triethanolamine | triisopropanolamine |

1.9. Amides of β-(3,5-di-tert-butyl-4-hydroxyphenyl)-propionic acid for example,
N,N'-di-(3,5-di-tert-butyl-4-hydroxyphenylpropionyl)-hexamethylenediamine
N,N'-di-(3,5-di-tert-butyl-4-hydroxyphenylpropionyl)-trimethylenediamine
N,N'-di-(3,5-di-tert-butyl-4-hydroxyphenylpropionyl)-hydrazine 1.10 Diarylamines, for example, diphenylamine, N-phenyl-1-naphthylamine, N-(4-tert-octylphenyl)-1-naphthylamine, 4,4'-di-tert-octyl-diphenylamine, reaction product of N-phenylbenzylamine and 2,4,4-trimethylpentene, reaction product of diphenylamine and 2,4,4-trimethylpentene, reaction product of N-phenyl-1-naphthylamine and 2,4,4-trimethylpentene.

2. UV absorbers and light stabilizers 2.1. 2-(2'-Hydroxyphenyl)-benzotriazoles, for example, the 5'-methyl-, 3',5'di-tert-butyl-, 5'-tert-butyl-, 5'-(1,1,3,3-tetramethylbutyl)-, 5-chloro-3',5'-di-tert-butyl-, 5-chloro-3'-tert-butyl-5'-methyl-, 3'-sec-butyl-5'-tert-butyl-, 4'-octoxy, 3',5'-di-tert-amyl-, 3',5'-bis(α,α-dimethylbenzyl),3'-tert-butyl-5'-(2-(omega-hydroxy-octa-(ethyleneoxy)carbonyl-ethyl)-, 3'-dodecyl-5'-methyl-, and 3'-tert-butyl-5'-(2-octyloxycarbonyl)ethyl-, and dodecylated-5'-methyl derivatives.

2.2. 2-Hydroxy-benzophenones, for example, the 4-hydroxy-, 4-methoxy-, 4-octoxy, 4-decyloxy-, 4-dodecyloxy-, 4-benzyloxy, 4,2',4'-trihydroxy- and 2'-hydroxy-4,4'-dimethoxy derivatives.

2.3. Esters of optionally substituted benzoic acids for example, phenyl salicylate, 4-tert-butylphenyl salicylate, octylphenyl salicylate, dibenzoylresorcinol, bis-(4-tert-butylbenzoyl, resorcinol, benzoylresorcinol, 3,5-di-tert-butyl-4-hydroxybenzoic acid 2,4-di-tert-butylphenyl ester and 3,5-di-tert-butyl-4-hydroxybenzoic acid hexadecyl ester.

2.4. Acrylates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline.

2.5. Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-diethanolamine, nickel dibutyldithiocarbamate, nickel salts of 4-hydroxy-3,5-di-tert-butylbenzylphosphonic acid monoalkyl esters, such as of the methyl, ethyl or butyl ester, nickel complexes of ketoximes such as of 2-hydroxy-4-methyl-phenyl undecyl ketoxime, nickel complexes of 1-phenyl-4-lauroyl-5-hydroxy-pyrazole, optionally with additional ligands.

2.6. Sterically hindered amines, for example bis-(2,2,6,6-tetramethylpiperidyl) sebacate, bis-(1,2,2,6,6-pentamethylpiperidyl) sebacate, n-butyl-3,5-di-tert.butyl-4-hydroxybenzyl malonic acid bis-(1,2,2,6,6-pentanemethylpiperidyl)ester, condensation product of 1-hydroxyethyl-2,2,6,6-tetramethyl-4-hydroxypiperidine and succinic acid, condensation product of N,N'-(2,2,6,6-tetra-methylpiperidyl)-hexamethylenediamine and 4-tert-octylamino-2,6-dichloro-s-triazine, tris-(2,2,6,6-tetramethylpiperidyl)-nitrilotriacetate, tetrakis-(2,2,6,6-tetramethyl-4-piperidyl) 1,2,3,4-butanetetracarboxylate, 1,1' (1,2-ethanediyl)-bis-(3,3,5,5-tetramethylpiperazinone), bis (1-octyloxy-2,2,6,6-tetramethylpiperidin-4-yl) sebacate.

2.7. Oxalic acid diamides, for example, 4,4'-di-octyloxy-oxanilide, 2,2'-di-octyloxy-5,5'-di-tert-butyl-oxanilide, 2,2'-di-dodecyloxy-5,5'-di-tert-butyl-oxanilide, 2-ethoxy-2'-ethyl-oxanilide, N,N'-bis(3-dimethylaminopropyl)-oxalamide, 2-ethoxy-5-tert-butyl-2'-ethyloxanilide and its mixture with 2-ethoxy-2'-ethyl-5,4'-di-tert-butyloxanilide and mixtures of ortho- and para-methoxy- as well as of o- and p-ethoxy-disubstituted oxanilides.

2.8. Hydroxyphenyl-s-triazines, for example 2,6-bis-(2,4-dimethylphenyl)-4-(2-hydroxy-4-octyloxyphenyl)-s-triazine; 2,6-bis-(2,4-dimethylphenyl)-4-(2,4-dihydroxyphenyl)-s-triazine; 2,4-bis(2,4-dihydroxyphenyl)-6-(4-chlorophenyl)-s-triazine; 2,4-bis[2-hydroxy-4-(2-hydroxyethoxy)phenyl]-6-(4-chlorophenyl)-s-triazine; 2,4-bis[2-hydroxy-4-(2-hydroxy-4-(2-hydroxyethoxy)phenyl]6-(2,4-dimethylphenyl)-s-triazine; 2,4-bis[2-hydroxy-4-(2-hydroxyethoxy)phenyl]-6-(4-bromophenyl)-s-triazine; 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine.

3. Metal deactivators, for example, N,N'-diphenyloxalic acid diamide, N-salicylal-N'-salicyloylhydrazine, N,N'-bis-salicyloylhydrazine, N,N'bis-(3,5-di-tert-butyl-4-hydroxyphenylpropionyl)-hydrazine, 3-salicyloylamino-1,2,4-triazole, bis-benzylidene-oxalic acid dihydrazide.

4. Phosphites and phosphonites, for example, triphenyl phosphite, diphenylalkyl phosphites, phenyldialkyl phosphites, tri-(nonylphenyl) phosphite, trilauryl phosphite, trioctadecyl phosphite, di-stearyl-pentaerythritol diphosphite, tris-(2,4-di-tert-butylphenyl) phosphite, di-isodecyl-pentaerythritol diphosphite, di-(2,4,6-tri-tert-butylphenyl)-pentaerythritol diphosphite, di-(2,4-di-tert-butyl-6-methylphenyl)-pentaerythritol diphosphite, di-(2,4-di-tert-butylphenyl)pentaerythritol diphosphite, tristearyl-sorbitol triphosphite, tetrakis-(2,4-di-tert-butylphenyl) 4,4'-diphenylylenediphosphonite.

5. Compounds which destroy peroxide, for example, esters of β-thiodipropionic acid, for example the lauryl, stearyl, myristyl or tridecyl esters, mercapto-benzimidazole or the zinc salt of 2-mercaptobenzimidazole, zinc dibutyl-dithiocarbamate, dioctadecyl disulfide, pentaerythritol tetrakis-(β,-dodecylmercapto)-propionate.

6. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

7. Nitrones, for example, N-benzyl-alpha-phenyl nitrone, N-ethyl-alpha-methyl nitrone, N-octyl-alpha-heptyl nitrone, N-lauryl-alpha-undecyl nitrone, N-tetradecyl-alpha-tridecyl nitrone, N-hexadecyl-alpha-pentadecyl nitrone, N-octadecyl-alpha-heptadecylnitrone, N-hexadecyl-alpha-heptadecyl nitrone, N-octadecyl-alpha-pentadecyl nitrone, N-heptadecyl-alpha-heptadecyl nitrone, N-octadecyl-alpha-hexadecyl nitrone, nitrone derived from N,N-dialkylhydroxylamine derived from hydrogenated tallow amine.

8. Polyamide stabilizers, for example copper salts in combination with iodides and/or phosphorus compounds and salts of divalent manganese.

9. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

10. Nucleating agents, for example, 4-tert-butyl-benzoic acid, adipic acid, diphenylacetic acid.

11. Fillers and reinforcing agents, for example, calcium carbonate, silicates, glass fibers, asbestos, talc, kaolin, mica, barium sulfate, metal oxides and hydroxides, carbon black, graphite.

12. Other additives, for example, plasticizers, lubricants, emulsifiers, pigments, optical brighteners, flameproofing agents, anti-static agents, blowing agents and thiosynergists such as dilauryl thiodipropionate or distearyl thiodipropionate.

13. Benzofuranones and indolinones, for example those disclosed in U.S. Pat. Nos. 4,325,863, 4,338,244 or 5,175,312, or 3-[4-(2-acetoxyethoxy)phenyl]-5,7-di-tert-butyl-benzofuran-2one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-di-methyl-4-pivaloyloxyphenyl)-5,7-di-tert-butyl-benzofuran-2-one.

The co-stabilizers, with the exception of the benzofuranones listed under 13, are added for example in concentrations of 0.01 to 10%, relative to the total weight of the material to be stabilized.

Further preferred compositions comprise, in addition to components (a) and (b) further additives, in particular phenolic antioxidants, light stabilizers or processing stabilizers.

Particularly preferred additives are phenolic antioxidants (item 1 of the list), sterically hindered amines (item 2.6 of the list), phosphites and phosphonites (item 4 of the list), UV absorbers (item 2 of the list) and peroxide-destroying compounds (item 5 of the list).

Additional additives (stabilizers) which are also particularly preferred are benzofuran-2-ones, such as described, for example, in U.S. Pat. Nos. 4,325,863, 4,338,244 or 5,175,312.

The phenolic antioxidant of particular interest is selected from the group consisting of n-octadecyl 3,5-di-tert-butyl-4-hydroxyhydrocinnamate, neopentanetetrayl tetrakis(3,5-di-tert-butyl-4-hydroxyhydrocinnammate), di-n-octadecyl 3,5-di-tert-butyl-4-hydroxybenzylphosphonate, 1,3,5-tris(3,5-di-tert-butyl-4-hydroxybenzyl)isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxycinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)isocynurate, 1,1,3,-tris(2-methyl-4-hydroxy-5-tert-butylphenyl)butane, 1,3,5-tris-[2-(3,5-di-tert-butyl-4-hydroxyhydrocinnamoyloxy) ethyl]isocyanurate, 3,5-di-(3,5-di-tert-butyl-4-hydroxybenzyl)mesitol, hexamethylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, N,N'-bis[2-(3,5-di-tert-butyl-4-hydroxyhydrocinnamoyloxy)-ethyl]-oxamide, 2,4-bis(octylthiomethyl)-6-methylphenol, and 2,4-bis(octylthiomethyl)-6-tert-butylphenol.

A most preferred phenolic antioxidant is neopentanetetrayl tetrakis(3,5-di-tert-butyl-4-hydroxyhydrocinnamate), n-octadecyl 3,5-di-tert-butyl-4-hydroxyhydrocinnamate, 1,3,5-tri-methyl-2,4,6-tris(3,5-di-tert-butyl-4-hydroxybenzyl)benzene, 1,3,5-tris(3,5-di-tert-butyl-4-hydroxybenzyl)isocyanurate, 2,6-di-tert-butyl-p-cresol, 2,2'-ethylidene-bis(4,6-di-tert-butylphenol), 2,4-bis(octylthiomethyl)-6-methylphenol or 2,4-bis(octylthiomethyl)-6-tert-butyl-phenol.

The hindered amine compound of particular interest is selected from the group consisting of bis(2,2,6,6-tetramethylpiperidin-4-yl)sebacate, bis(1,2,2,6,6-pentamethylpiperidin-4-yl)sebacate, di(1,2,2,6,6-pentamethylpiperidin-4-yl) (3,5-di-tert-butyl-4-hydroxybenzyl)butylmalonate, 4-benzoyl-2,2,6,6-tetramethylpiperidine, 4-stearyloxy-2,2,6,6-tetramethylpiperidine, 3-n-octyl-7,7,9,9-tetramethyl-1,3,8-triaza-spiro[4.5]decane-2,4-dione, tris(2,2,6,6-tetramethylpiperidin-4-yl) nitrilotriacetate, 1,2-bis(2,2,6,6-tetramethyl-3-oxopiperazin-4-yl)ethane, 2,2,4,4-tetramethyl-7-oxa-3,20-diaza-21-oxodispiro[5.1.11.2] heneicosane, polycondensation product of 2,4-dichloro-6-tert-octylamino-s-triazine and 4,4'-hexamethylenebis (amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylenebis-(amino-2,2,6,6-tetramethylpiperidine) and 1,2-dibromoethane, tetrakis(2,2,6,6-tetramethylpiperidin-4-yl) 1,2,3,4-butanetetracarboxylate, tetrakis(1,2,2,6,6-pentamethylpiperidin-4-yl) 1,2,3,4-butanetetracarboxylate, polycondensation product of 2,4-dichloro-6-morpholino-s-triazine and 4,4'-hexamethylenebis(amino-2,2,6,6-tetramethylpiperidine), N,N',N'',N'''-tetrakis[(4,6-bis(butyl-1,2,2,6,6-pentamethylpiperidin-4-yl)-amino-s-triazin-2-yl]-1,10-diamino-4,7-diazadecane, mixed [2,2,6,6-tetramethylpiperidin-4-yl/β,β,β',β'-tetramethyl-3,9-(2,4,8,10-tetraoxaspiro[5.5]-undecane)diethyl]1,2,3,4-butanetetracarboxylate, mixed [1,2,2,6,6-pentamethylpiperidin-4-yl/β,β,β',β'-tetramethyl-3,9-(2,4,8,10-tetraoxaspiro[5.5]undecane)diethyl]1,2,3,4-butanetetracarboxylate, octamethylene bis(2,2,6,6-tetramethylpiperidin-4-carboxylate), 4,4'-ethylenebis(2,2,6,6-tetramethylpiperazin-3-one), N-2,2,6,6-tetramethylpiperidin-4-yl-n-dodecylsuccinimide, N-1,2,2,6,6-pentamethylpiperidin-4-yl-n-dodecylsuccinimide, N-1-acetyl-2,2,6,6-tetramethylpiperidin-4-yln-dodecylsuccinimide, 1-acetyl3-dodecyl-7,7,9,9-tetramethyl-1,3,8-triazaspiro[4.5]decane-2,4-dione, di-(1-octyloxy-2,2,6,6-tetramethylpiperidin-4-yl)sebacate, di-(1-cyclohexyloxy-2,2,6,6-tetramethylpiperidin-4-yl) succinate, 1-octyloxy-2,2,6,6-tetramethyl-4-hydroxy-piperidine, poly-{[6-tert-octylamino-s-triazin-2,4-diyl][2-(1-cyclohexyloxy-2,2,6,6-tetramethylpiperidin-4-yl)imino-hexamethylene-[4-(1-cyclohexyloxy-2,2,6,6-tetramethylpiperidin-4-yl)imino], 2,4,6-tris[N-(1-cyclohexyloxy-2,2,6,6-tetramethylpiperidin- 4-yl)-n-butylamino]-s-triazine, 2-(2-hydroxyethyl)amino-4, 6-bis[N-(1-cyclohexyloxy-2,2,6,6-tetramethylpiperidin-4-yl)-n-butylamino]-s-triazine, 1,2-bis(3,3,5,5-tetramethylpiperazin-2-on-1-yl)ethane, 1,3,5-tris{N-cyclohexyl-N-[2-(3,3,5,5-tetramethylpiperazin-2-on-1-yl) ethyl]amino}-s-triazine, 1,3,5-tris(N-cyclohexyl-N-[2-(3,3,4,5,5-pentaamethylpiperazin-2-on-1-yl)ethyl]amino}-s-triazine, reaction of 2–4 equivalents of 2,4-bis[(1-cyclohexyloxy-2,2,6,6-tetramethylpiperidin-4-yl)butyl-amino]-6-chloro-s-triazine with 1 equivalent of N,N'-bis(3-aminopropyl)ethylenediamine, bis[1-(2-hydroxy-2-methylpropoxy)-2,2,6,6-tetramethylpiperidin-4-yl]sebacate, mixture of bis[1-(2-hydroxy-2-methylpropoxy)-2,2,6,6-tetramethylpiperidin-4-yl]glutarate and bis[1-(2-hydroxy-2-methylpropoxy)-2,2,6,6-tetramethylpiperidin-4-yl]adipate, 4-hydroxy-1-(2-hydroxy-2-methylpropoxy)-2,2,6,6-tetramethylpiperidine and 4-octadecyloxy-1-(2-hydroxy-2-methylpropoxy)-2,2,6,6-tetramethylpiperidine.

A most preferred hindered amine compound is bis(2,2,6,6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)butylmalonate, the polycondensation product of 1-(2-hydroxyethyl)-2,2,6,6-tetramethyl-4-hydroxypiperidine and succinic acid, the polycondensation product of 2,4-dichloro-6-tert-octylamino-s-triazine and 4,4'-hexamethylenebis(amino-2,2,6,6-tetramethylpiperidine), N ,N', N'',N'''-tetrakis[(4,6-bis(butyl-(1,2,2,6,6-pentamethylpiperidin-4-yl)amino)-s-triazine-2-yl]-1,10-diamino-4,7-diazadecane. di-(1-octyloxy-2,2,6,6-tetramethylpiperidin-4-yl) sebacate, di-(1-cyclohexyloxy-2,2,6,6-tetramethylpiperidin-4-yl) succinate, 1-octyloxy-2,2,6,6-tetramethyl-4-hydroxy-piperidine, poly-{[6-tert-octylamino-s-triazin-2,4-diyl][2-(1-cyclohexyloxy-2,2,6,6-tetramethylpiperidin-4-yl)imino-hexamethylene-[4-(1-cyclohexyloxy-2,2,6,6-tetramethylpiperidin-4-yl)imino], 2,4,6-tris[N-(1-cyclohexyloxy-2,2,6,6-tetramethylpiperidin-4-yl)-n-butylamino]-s-triazine, 2-(2-hydroxyethyl)amino-4, 6-bis[N-(1-cyclohexyloxy-2,2,6,6-tetramethylpiperidin-4-yl)-n-butylamino]-s-triazine, 1,2-bis(3,3,5,5-tetramethylpiperazin-2-on-1-yl)ethane, 1,3,5-tris{N-cyclohexyl-N-[2-(3,3,5,5-tetramethylpiperazin-2-on-1-yl) ethyl]amino}-s-triazine, 1,3,5-tris{N-cyclohexyl-N-[2-(3,3,4,5,5-pentaamethylpiperazin-2-on-1-yl)ethyl]amino}-s-triazine, reaction of 2–4 equivalents of 2,4-bis[(1-cyclohexyloxy-2,2,6,6-tetramethylpiperidin-4-yl)butyl-amino]-6-chloro-s-triazine with 1 equivalent of N,N'-bis(3-aminopropyl)ethylenediamine, bis[1-(2-hydroxy-2-methylpropoxy)-2,2,6,6-tetramethylpiperidin-4-yl]sebacate, mixture of bis[1-(2-hydroxy-2-methylpropoxy)-2,2,6,6-tetramethylpiperidin-4-yl]glutarate and bis[1-(2-hydroxy-2-methylpropoxy)-2,2,6,6-tetramethylpiperidin-4-yl]adipate, 4-hydroxy-1-(2-hydroxy-2-methylpropoxy)-2,2,6,6-tetramethylpiperidine or 4-octadecyloxy-1-(2-hydroxy-2-methylpropoxy)-2,2,6,6-tetramethylpiperidine.

The instant composition can additionally contain another UV absorber selected from the group consisting of the benzotriazoles, s-triazines, the oxanilides, the hydroxybenzophenones, benzoates and the α-cyanoacrylates.

As described above, the laminated or multilayer constructions which use an adhesive layer described above containing a highly soluble, photostable s-triazine of formula I, II, III, IV, V or VI are selected from, but are not limited to, the group consisting of (a) Retroreflective Sheets and Signs and Conformable Marketing Sheets;

(b) Solar Control Films of Various Construction;

(c) Corrosion Resistant Silver Mirrors and Solar Reflectors;

(d) Reflective Print Labels;

(e) UV Absorbing Glasses and Glass Coatings;

(f) Electrochromic Devices;

(g) Films/Glazings;

(h) Windscreens and Intermediate Layers; and (i) Optical Films.

Preferably, the laminated or multilayer constructions which use an adhesive layer containing a s-triazine UV absorber of formula I, II, III, IV, V or VI is selected from the group consisting of (a) Retroreflective Sheets and Signs and Conformable Marketing Sheets;

(b) Solar Control Films of Various Construction;

(e) UV Absorbing Glasses and Glass Coatings;

(g) Films/Glazings; and (h) Windscreens and Intermediate Layers.

Most especially the laminated or multilayer constructions are (b) Solar Control Films of Various Construction, or (h) Windscreens and Intermediate Layers.

The adhesive of component (a) which can be used in a laminated or multilayer article is selected from, but not limited to, the group consisting of (i) Pressure Sensitive Adhesives;

(ii) Rubber-Based Adhesives;

(iii) Solvent and/or Emulsion Based Adhesives;

(iv) Hot Melt Adhesives; and (v) Natural Product Based Adhesives.

The adhesives are selected from the following chemical groups (i) Polyurethanes;

(ii) Polyacrylics;

(iii) Epoxys;

(iv) Phenolics;

(v) Polyimides;

(vi) Poly(vinyl butyral);

(vii) Polycyanoacrylates;

(viii) Polyacrylates;

(ix) Ethylene/acrylic acid copolymers and their salts (ionomers);

(x) Silicon polymers;

(xi) Poly(ethylene/vinyl acetate);

(xii) Atatic polypropylene;

(xiii) Styrene-diene copolymers;

(xiv) Polyamides;

(xv) Hydroxyl-terminated polybutadiene;

(xvi) Polychloroprene;

(xvii) Poly(vinyl acetate);

(xviii) Carboxylated styrene/butadiene copolymers;

(xix) Poly(vinyl alcohol); and (xx) Polyesters.

The following optional components are often also present in adhesive formulations and are presented here for illustrative purposes only and are not meant to limit the total adhesive compositions in any way. These optional components include plasticizers, adhesion promoters, waxes, petroleum waxes, elastomers, tackifier resins, oils, resins, polymers, rosin, modified rosin or rosin derivatives, hydrocarbon resins, terpene resins, paraffin wax, microcrystalline wax, synthetic hard wax and/or polyethylene wax. The amounts of these coadditives are those normally used in adhesive formulations.

Although in the instant invention, the instant s-triazines are intended for use in the adhesive and the adhesive layers of the laminated or multilayer articles, it is clear that the same beneficial UV absorption protection would be afforded to the articles if said s-triazines are also incorporated into the other layers of the articles, e.g. polymeric films with any dye or pigment present therein, whether by direct incorporation, by coextrusion or by migration from the adhesive layer into said other layer(s).

These polymers are those selected from the group consisting of (1) polyolefins;
(2) mixtures of polyolefins;
(3) copolymers of monoolefins and diolefins or other vinyl monomers;
(4) polystyrene, poly(p-methylstyrene) or poly(α-methylstyrene);
(5) copolymers of styrene or a-methylstyrene with dienes or acrylic derivative;
(6) graft copolymers of styrene or α-methylstyrene;
(7) halogen containing polymers;
(8) polymers derived from α,β-unsaturated acids and derivatives thereof;
(9) copolymers of monomers of (8) with each other or other unsaturated monomers;
(10) polymers derived from unsaturated alcohols and amines or the acyl derivatives or acetals thereof;
(11) polyacetals such as polyoxymethylene and those polyoxymethylenes which contain ethylene oxide as a comonomer, polyacetals modified with thermoplastic polyurethanes, acrylates or MBS;
(12) polyurethanes;
(13) polyamides and copolyamides from diamines and dicarboxylic acids and/or from aminocarboxylic acids or the corresponding lactams;
(14) polyureas or polyimides;
(15) polyesters derived from dicarboxylic acids and diols and/or from hydroxycarboxylic acids or the corresponding lactones, especially poly(ethylene terephthalate) (PET) and poly(ethylene 2,6-naphthalenedicarboxylate) (PEN);
(16) polycarbonates and polyester carbonates;
(17) polysulfones and polyether sulfones;
(18) crosslinked polymers derived from aldehydes on the one hand and phenols, ureas and melamines on the other hand;
(19) unsaturated polyester resins derived from copolyesters of saturated and unsaturated dicarboxylic acids with polyhydric alcohols and vinyl compounds as crosslinking agents;
(20) crosslinkable acrylic resins derived from substituted acrylates;
(21) blends of the aforementioned polymers;
(22) polysiloxanes;
(23) polyketimines in combination with unsaturated acrylic polyacetoacetate resins or with unsaturated acrylic resins;
(24) radiation curable compositions containing ethylenically unsaturated monomers or oligomers and a polyunsaturated aliphatic oligomer; and
(25) ionomers (copolymers of ethylene/acrylic acid and their salts).

Additionally, the instant adhesives particularly when the adhesive is poly(vinyl butyral) may be inserted between two (or more) layers of glass such as in an automobile windshield.

Preferably the adhesive component (a) is a resin selected from the group consisting of poly(vinyl butyral), ethylene/vinyl acetate copolymers, polyacrylics, polyacrylates, natural rubber, polycyanoacrylates, poly(vinyl alcohol), styrene/butadiene rubber, phenolics, urea-formaldehyde polymers, epoxy resins, vinyl polymers, polyamides, polyurethanes, polyesters and styrene block copolymers.

Most especially, the adhesive of component (a) is a resin selected from the group consisting of poly(vinyl butyral), ethylene/vinyl acetate copolymers, polyacrylics, polyacrylates, natural rubber, polycyanoacrylates, poly(vinyl alcohol), styrene/butadiene rubber, phenolics, vinyl polymers, polyurethanes and styrene block copolymers.

The following examples are for illustrative purposes only and are not to be construed to limit the instant invention in any manner whatsoever.

EXAMPLE 1

UV Absorption of Selected s-Triazine UV Absorbers

The table below shows the UV absorption of various s-triazine UV absorbers. The UV absorption spectra are measured in ethyl acetate solution at approximately 20 mg/L concentration. These data show the high molar extinction values at the wavelength maxima for each of the compounds. Typical benzotriazole and benzophenone UV absorbers are shown for comparison. The molar extinction values for the s-triazines are far greater than the values for either the benzotriazoles or benzophenones.

| Compound* | λmax (nm) | Molar Extinction Coefficient |
|---|---|---|
| A | 342 | 9880 |
| B | 359 | 8983 |
| C | 349 | 13,953 |
| D | 344 | 15,700 |
| E | 319 | 65,000 |
| F | 354 | 35,000 |
| G | 289 | 39,800 |
| H | 347 | 53,500 |
| I | 291 | 40,100 |
| J | 291 | 75,800 |
| K | 359 | 60,000 |
| L | 291 | 41,100 |
| M | 289 | 39,200 |
| N | 353 | 38,000 |
| O | 358 | 55,400 |

*A is 4-methoxy-2,2'-dihydroxybenzophenone.
B is 4,4'-dimethoxy-2,2'-dihydroxybenzophenone.
C is 5-chloro-2-(2-hydroxy-3,5-di-tert-butylphenyl)-2H-benzotriazole, TINUVIN ® 327, Ciba.
D is 2-(2-hydroxy-3,5-di-α-cumylphenyl)-2H-benzotriazoie, TINUVIN ® 900, Ciba.
E is 2,4-bis(4-biphenylyl)-6-(2-hydroxy-4-octyloxycarbonylethylideneoxyphenyl)-s-triazine.
F is 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine.

-continued

| Compound* | λmax (nm) | Molar Extinction Coefficient |
|---|---|---|

G is 2,4-bis(2,4-dimethylphenyl)-6-[2-hydroxy-4-(3-benzyloxy-2-hydroxypropyloxy)phenyl]-2-triazine.
H is 2,4-bis(2-hydroxy-4-butyloxyphenyl)-6-(2,4-di-butyloxyphenyl)-s-triazine.
I is 2,4-bis(2,4-dimethylphenyl)-6-[2-hydroxy-4-(3-nonyloxy*-2-hydroxypropyloxy)-5-α-cumyl-phenyl]-s-triazine). (*denotes a mixture of octyloxy, nonyloxy and decyloxy groups)
J is methylenebis-{2,4-bis(2,4-dimethylphenyl)-6-[2-hydroxy-4-(3-butyloxy-2-hydroxypropoxy)-phenyl]-s-triazine}, methylene bridged dimer mixture bridged in the 3:5', 5:5' and 3:3' positions in a 5:4:1 ratio.
K is 2,4,6-tris(2-hydroxy-4-isooctyloxycarbonylisopropylideneoxyphenyl)-s-triazine.
L is 2,4-bis(2,4-dimethylphenyl)-6-(2-hydroxy-4-hexyloxy-5-α-cumylphenyl)-s-triazine.
M is 2,4-bis(2,4-dimethylphenyl)-6-(2-hydroxy-4-octyloxyphenyl)-s-triazine, CYASORB ® 1164, Cytec.
N is 2-(2,4,6-trimethylphenyl)-4,6-bis[2-hydroxy-4-(3-butyloxy-2-hydroxypropyloxy)phenyl]-s-triazine.
O is 2,4,6-tris[2-hydroxy-4-(3-sec-butyloxy-2-hydroxypropyloxy)phenyl]-s-triazine.

EXAMPLE 2 s-Triazine UV Absorber Solubility in Adhesive

To measure the solubility of the s-triazine UV absorber compounds, the compound is added to a typical adhesive GELVA® 263 (Solutia) which is a 44.5% solution of a polyacrylate in a mixture of ethyl acetate and hexane. The polyacrylate is a copolymer of methyl methacrylate, 2-ethylhexyl methacrylate and glycidyl methacrylate.

The test s-triazine is dissolved in 5 mL of ethyl acetate, toluene or a mixture of ethyl acetate and toluene. To the solution is added 5 g of GELVA® 263 and 2–3 mL of the resulting solution is placed into individual watch glasses. Solubility is then evaluated based upon observed crystallization once the solvent has evaporated. Observations start after several hours and then continue over a period of several weeks.

The solubility values given in the table below are approximate maximum concentrations where no sign of subsequent crystallization is evident. Solubilities are reported in weight of total s-triazine added to GELVA® 263 as is. From these data it is clear that some of the instant s-triazines are considerably more soluble in adhesives (in this case GELVA® 263) than many benzotriazoles of the prior art. The use of many UV absorbers in adhesives has been limited in the past by the limited solubility and compatibility of some UV absorber compounds. By using selected instant s-triazines the use levels can be increased substantially to add greatly increased stabilization protection which is further augmented by the excellent photostability of the instant s-triazine UV absorbers.

| Compound* | Trade Name or Class | Solubility without Crystallization (%) |
|---|---|---|
| D | TINUVIN ® 900 | 2.0 |
| C | TINUVIN ® 327 | 2.0 |
| M | s-triazine | 1.0 |
| L | s-triazine | 2.0 |
| J | s-triazine | 4.0 |
| O | s-triazine | 4.0 |
| E | s-triazine | 4.0 |
| F | s-triazine | 8.0 |
| H | s-triazine | 8.0 |
| K | s-triazine | 8.0 |
| N | s-triazine | 11.3 |
| I | s-triazine | 22.6 |
| G | s-triazine | 22.6 |

*The chemical names of each of the compounds are identified at the end of the table in Example 1.

The solubility of the s-triazines differs depending on the specific structures of said compounds.

EXAMPLE 3

Weathering Experiments

To ascertain the effect of durability and loss rate of the s-triazine UV absorber test compounds, the following test is carried out on adhesive compositions in selected articles.

GELVA® 263 (Solutia) adhesive is described in Example 2. A biaxially oriented poly(ethylene terephthalate) (PET) film is obtained from United States Plastics.

The GELVA® 263 is reduced 50% by dilution with ethyl acetate to a final resin solids content of 23%. The test stabilizer is dissolved in the GELVA® 263 solution and samples are prepared in duplicate. The formulations seen in the table below are based on total coating solids. Approximately 8 micron coatings are applied to 1.5 inch glass discs for each formulation using a Headway Research Inc. Photo Resist Spinner (Model EC101DT) operating at 5000 rpm for 10 seconds. All formulations receive the same 80° C.×3 minute bake in a Hereaus model LUT 6050F oven operating at 3 air changes/minute.

Since the adhesive remains tacky even after baking a direct thickness measurement is not possible. Indirect film thickness is determined by creating an adhesive sandwich between to layers of PET film and comparing its thickness versus two PET sheets without adhesive using magnetic induction methodology.

The spin coating conditions are thus obtained. Further, since the spin coating conditions are not changed for applying the adhesive onto the glass, very little if any thickness variations are expected. After curing it in an oven, a layer of PET (ca 2 mils) is placed over the adhesive and pressed down.

Absorbance spectra are collected using a Perkin Elmer Lambda 19 Spectrophotometer running UVWINLAB software. Absorbance data are collected from 400–300 nm every half nanometer at a speed of 240 nm/minute and a slit width of 2 nm.

Weathering is done at a controlled irradiance at 6500 W. The cycle is as follows: 3.8 hours straight irradiance with no water spray, followed by one hour darkness. In the light cycle, the black panel temperature is controlled at 89° C. The chamber (dry bulb) temperature is 62° C. in the light cycle. The relative humidity in the light cycle is in the range of 50–55% and in the dark cycle 95%. The chamber (dry bulb) temperature is 38° C. in the dark cycle.

The test samples are placed in a Xenon Arc Weather-O-meter with the glass facing the Xenon lamp to emulate articles such as solar films. UV spectra are obtained at about 250 hour intervals. UV spectra are obtained at 500 hours and the samples are rotated to insure that all samples receive similar weathering conditions.

To follow the loss of the UV absorber from the adhesive composition, UV spectra measured initially and after weathering. The UV spectrophotometer measure absorbance linearly up to 5.5 absorbance units using a reference beam attenuation technique.

It is assumed that the degradation products for the UV absorber do not contribute to the UV spectrum. This is tested by following the ratio of absorbance of the band at 300 nm and the band at about 340 nm. The ratio does not change upon weathering the sample. This suggests that the UV spectrum of the weathered films correspond to the amount of UV absorber remaining in the film with very little if any contribution to the spectrum by the photodegradants.

The results after 1050 hours exposure are given in the table below.

| Compound (%)* | Absorbance Units Loss | UV Absorber Loss in % |
|---|---|---|
| I (8%) | 1.45 | 50.3 |
| II (10%) | 0.86 | 30.6 |
| III (8%) | 0.24 | 5.5 |

*% is the weight amount in formulation.
I is 2,2'-dihydroxy-4-methoxybenzophenone.
II is octyl 3-(2H-benzotriazol-2-yl)-5-tert-butyl-4-hydroxyhydrocinnamate.
III is 2,4,6-tris(2-hydroxy-4-isooctyloxycarbonylisopropylideneoxyphenyl)-s-triazine (Compound K given in the list in Example 1).

These data clearly show that the instant s-triazine is especially durable in adhesives as measured by the low loss rate of absorbance values after exposure to actinic radiation. In summary, the instant s-triazines combine both great photostability and unexpectedly high solubility in adhesive systems.

EXAMPLE 4

Weathering Experiments

To ascertain the effect of durability and loss rate of other s-triazine UV absorber test compounds, the following test is carried out on adhesive compositions in selected articles as described in Example 3.

Each of the test samples also contain 0.5% by weight of the hindered amine bis(1-octyloxy-2,2,6,6-tetramethylpiperidin-4-yl) sebacate. The results after 1338 hours exposure are given in the table below.

| Compound (%)* | Absorbance Units Loss | UV Absorber Loss in % |
|---|---|---|
| I (4%) | 0.86 | 55.0 |
| II (4%) | 0.07 | 4.0 |
| III (3.2%) | 0.17 | 6.7 |

*% is the weight amount in formulation.
I is 2,2'-dihydroxy-4-methoxybenzophenone.
II is 2,4,6-tris(2-hydroxy-4-isooctyloxycarbonylisopropylideneoxyphenyl)-s-triazine (Compound K given in the list in Example 1).
III is 2,4-bis(4-biphenylyl)-6-(2-hydroxy-4-octyloxycarbonylethylideneoxyphenyl)-s-triazine (Compound E given in the list in Example 1).

These data clearly show that the instant s-triazine is especially durable in adhesives as measured by the low loss rate of absorbance values after exposure to actinic radiation. In summary, the instant s-triazines combine both great photostability and unexpectedly high solubility in adhesive systems.

EXAMPLE 5

Windshield Interlayer Assembly

When an adhesive composition containing a s-triazine UV absorber is placed between two sheets of glass, the assembly resembles a typical windshield. In this confined environment, there is no chance that the s-triazine stabilizer can escape by volatility since the glass sheets provide a impervious container for the adhesive interlayer. The photostability and durability of the soluble s-triazine stabilizer is now paramount. s-Triazine UV absorbers whose structures causes them to be volatile and which precludes their use in other types of applications can be used in such windshield interlayer assemblies with impunity to achieve long lasting and stable windshield structures.

A windshield or windscreen prototype structure is exposed to weathering according to the procedure described in Example 3. The GELVA® 263 (Solutia) adhesive is placed between two sheets of glass and additionally contains 3.2 to 4% by weight of selected test UV absorbers. The structure is then exposed to weathering for 1338 hours as described in Example 3.

The results are seen in the table below. Each test sample also contains 0.5% of the hindered amine bis(1-octyloxy-2,2,6,6-tetramethylpiperidin-4-yl) sebacate.

| Compound (%)* | Absorbance Loss | Percent Loss in Absorbance |
|---|---|---|
| I (4%) | 1.22 | 83 |
| II (4%) | 0.44 | 26 |
| III (3.2%) | 0.48 | 19 |

*% is the weight amount in formulation.
I is 2,2'-dihydroxy-4-methoxybenzophenone.
II is 2,4,6-tris(2-hydroxy-4-isooctyloxycarbonylisopropylideneoxyphenyl)-s-triazine (Compound K given in the list in Example 1).
III is 2,4-bis(4-biphenylyl)-6-(2-hydroxy-4-octyloxycarbonylethylideneoxyphenyl)-s-triazine (Compound E given in the list in Example 1).

These data clearly show that the instant s-triazines are especially durable in adhesives as measured by the low loss rate of absorbance values after exposure to actinic radiation. Additionally, it is seen that these s-triazines are far superior to the benzophenones in adhesive compositions. Furthermore, the combination of the s-triazines with a hindered amine stabilizer offers quite superior performance. In summary, the instant s-triazines combine both great photostability and unexpectedly high solubility in adhesive systems.

EXAMPLE 6

The instant s-triazine UV absorbers can be used in film and rigid plastic protective overlaminates for printed matter and photographs providing excellent photostability.

EXAMPLE 7

The instant s-triazine UV absorbers can be used in backlit displays to provide excellent long term stabilization.

EXAMPLE 8

The instant s-triazine UV absorbers can be used in semi-transparent and opaque window displays, signs and decals wherein a film or rigid plastic graphic is laminated to window glass to provide excellent long term stabilization.

EXAMPLE 9

The instant s-triazine UV absorbers can be used in clear/tinted anti-graffiti films used over class, metal or plastic substrates to provide excellent long term stabilization.

EXAMPLE 10

The instant s-triazine UV absorbers can be used in clear anti-lacerative or "security" films used over or between layers of glass or polycarbonate to provide long term stabilization.

EXAMPLE 11

The instant s-triazine UV absorbers can be used in decorative and protective films and decals for painted surfaces such as on automobiles, buses, equipment and other exterior products to provide long term stabilization.

What is claimed is:

1. A stabilized adhesive composition, suitable for use as an adhesive layer in a laminated article or multilayer construction, which comprises (a) an adhesive; and (b) an effective stabilizing amount of a highly soluble, high molar extinction and photostable s-triazine UV absorber of formula I, II, III, IV V or VI

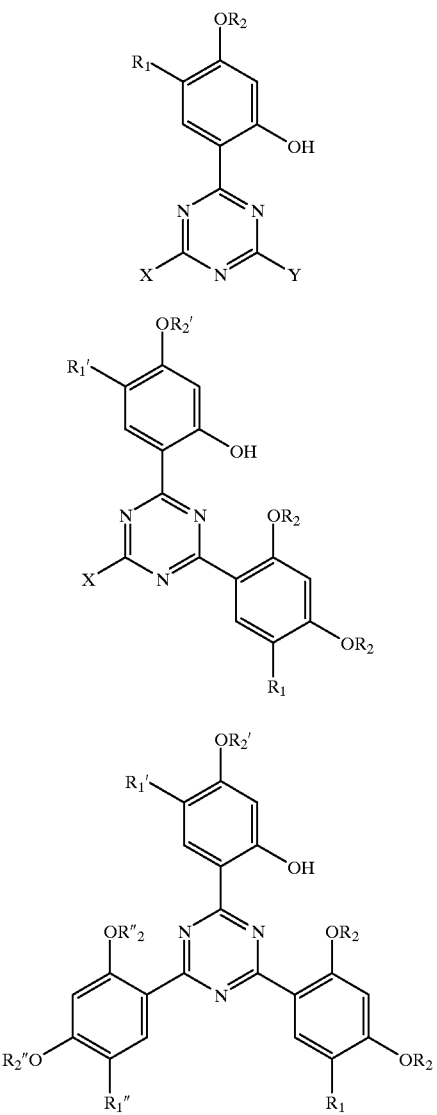

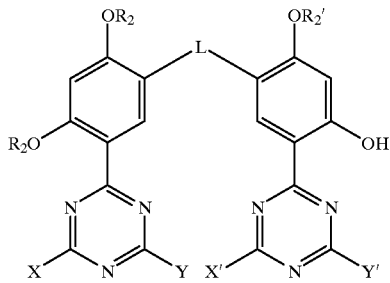

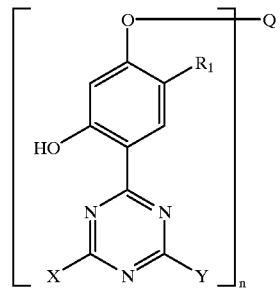

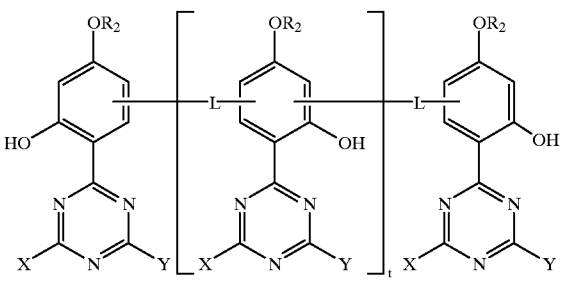

wherein

X and Y are independently phenyl, naphthyl, or said phenyl or said naphthyl substituted by one to three alkyl of 1 to 6 carbon atoms, by halogen, by hydroxy or by alkoxy of 1 to 6 carbon atoms or by mixtures thereof; or X and Y are independently $Z_1$ or $Z_2$;

$R_1$ is hydrogen, straight or branched chain alkyl of 1 to 24 carbon atoms, cycloalkyl of 5 to 12 carbon atoms, phenylalkyl of 7 to 15 carbon atoms, halogen, —$SR_3$, —$SOR_3$ or —$SO_2R_3$; or said alkyl, said cycloalkyl or said phenylalkyl substituted by one to three halogen, —$R_4$, —$OR_5$, —$N(R_5)_2$, —$COR_5$, —$COOR_5$, —$OCOR_5$, —CN, —$NO_2$, —$SR_5$, —$SOR_5$, —$SO_2R_5$ or —$P(O)(OR_5)_2$, morpholinyl, piperidinyl, 2,2,6,6-tetramethylpiperidinyl, piperazinyl or N-methylpiperidinyl groups or combinations thereof; or said alkyl or said cycloalkyl interrupted by one to four phenylene, —O—, —$NR_5$—, —$CONR_5$—, —COO—, —OCO— or —CO groups or combinations thereof; or said alkyl or said cycloalkyl both substituted and interrupted by combinations of the groups mentioned above;

$R_3$ is alkyl of 1 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms;

$R_4$ is aryl of 6 to 10 carbon atoms or said aryl substituted by one to three halogen, alkyl of 1 to 8 carbon atoms, alkoxy of 1 to 8 carbon atoms or combinations thereof; cycloalkyl of 5 to 12 carbon atoms; phenylalkyl of 7 to 15 carbon atoms or said phenylalkyl substituted on the phenyl ring by one to three halogen, alkyl of 1 to 8 carbon atoms, alkoxy of 1 to 8 carbon atoms or combinations thereof; or straight or branched chain alkenyl of 2 to 18 carbon atoms;

$R_5$ is defined as is $R_4$; or $R_5$ is also hydrogen or straight or branched chain alkyl of 1 to 24 carbon atoms, alkenyl of 2 to 24 carbon atoms; or $R_5$ is a group for formula

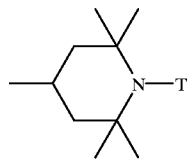

T is hydrogen, oxyl, hydroxyl, —$OT_1$, alkyl of 1 to 24 carbon atoms, said alkyl substituted by one to three hydroxy; benzyl or alkanoyl of 2 to 18 carbon atoms;

$T_1$ is alkyl of 1 to 24 carbon atoms, cycloalkyl of 5 to 12 carbon atoms, alkenyl of 2 to 24 carbon atoms, cycloalkenyl of 5 to 12 carbon atoms, phenylalkyl of 7 to 15 carbon atoms, a radical of a saturated or unsaturated bicyclic or tricyclic hydrocarbon of 7 to 12 carbon atoms or aryl of 6 o 10 carbon atoms or said aryl substituted by one to three alkyl of 1 to 4 carbon atoms;

$R_2$ is hydrogen, straight or branched chain alkyl of 1 to 24 carbon atoms or cycloalkyl of 5 to 12 carbon atoms; or said alkyl or said cycloalkyl substitute by one to four halogen, epoxy, glycidyloxy, furyloxy, —$R_4$, —$OR_5$, —$N(R_5)_2$, —$CON(R_5)_2$, —$COR_5$, —$COOR_5$, —$OCOR_5$, —$OCOC(R_5)=C(R_5)_2$, —$C(R_5)=CCOOR_5$, —CN, —NCO, or

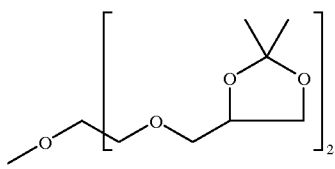

or combinations thereof; or said alkyl or said cycloalkyl interrupted by one to four epoxy, —O—, —$NR_5$—, —$CONR_5$—, —COO—, —OCO—, —CO—, —$C(R_5)=C(R_5)COO$—, —$OCOC(R_5)=C(R_5)$—, —$C(R_5)=C(R_5)$—, phenylene or phenylene-G-phenylene in which G is —O—, —S—, —$SO_2$—, —$CH_2$— or —$C(CH_3)_2$— or combinations thereof, or said alkyl or said cycloalkyl both substituted and interrupted by combinations of the groups mentioned above; or $R_2$ is —$SO_2R_3$ or —$COR_6$;

$R_6$ is straight or branched chain alkyl of 1 to 18 carbon atoms, straight or branched chain alkenyl of 2 to 12 carbon atoms, phenoxy, alkylamino of 1 to 12 carbon atoms, arylamino of 6 to 12 carbon atoms, —$R_7COOH$ or —NH—$R_8$—NCO;

$R_7$ is alkylene of 2 to 14 carbon atoms or phenylene;

$R_8$ is alkylene of 2 to 24 carbon atoms, phenylene, tolylene, diphenylmethane or a group

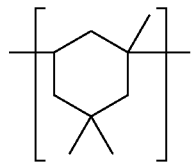

$R_1$, $R_1'$ and $R_1''$ are the same or different and are as defined for $R_1$;

$R_2$, $R_2'$ and $R_2''$ are the same or different and are as defined for $R_2$;

X, X', Y and Y' are the same or different and are as defined for X and Y;

t is 0 to 9;

L is straight or branched alkylene of 1 to 12 carbon atoms, cycloalkylene of 5 to 12 carbon atoms or alkylene substituted or interrupted by cyclohexylene or phenylene; or L is benzylidene; or L is —S—, —S—S—, —S—E—S—, —SO—, —$SO_2$—, —SO—E—SO—, —$SO_2$—E—$SO_2$—, —$CH_2$—NH—E—NH—$CH_2$— or

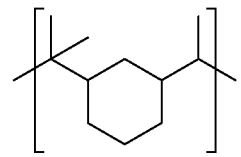

E is alkylene of 2 to 12 carbon atoms, cycloalkylene of 5 to 12 carbon atoms or alkylene interrupted or terminated by cycloalkylene of 5 to 12 carbon atoms;

n is 2, 3 or 4;

when n is 2; Q is straight or branched alkylene of 2 to 16 carbon atoms; or said alkylene substituted by one to three hydroxy groups; or said alkylene interrupted by one to three —CH=CH— or —O—; or said alkylene both substituted and interrupted by combinations of the groups mentioned above; or Q is xylylene or a group —CONH—$R_8$—NHCO—, —$CH_2CH(OH)CH_2O$—$R_9$—$OCH_2CH(OH)CH_2$—, —CO—$R_{10}$—CO—, or —$(CH_2)_m$—COO—$R_{11}$—OOC—$(CH_2)_m$—, where m is 1 to 3; or Q is

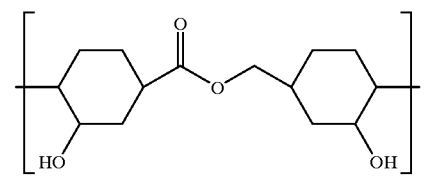

$R_9$ is alkylene of 2 to 50 carbon atoms; or said alkylene interrupted by one to ten —O—, phenylene or a group -phenylene-G-phenylene in which G is —O—, —S—, —$SO_2$—, —$CH_2$— or —$C(CH_3)_2$—;

$R_{10}$ is alkylene of 2 to 10 carbon atoms, or said alkylene interrupted by one to four —O—, —S— or —CH=CH—; or $R_{10}$ is arylene of 6 to 12 carbon atoms;

$R_{11}$ is alkylene of 2 to 20 carbon atoms or said alkylene interrupted by one to eight —O—;

when n is 3, Q is a group —[(CH$_2$)$_m$COO]$_3$—R$_{12}$ where m is 1 to 3, and R$_{12}$ is an alkanetriyl of 3 to 12 carbon atoms;

when n is 4, Q is a group —[(CH$_2$)$_m$COO]$_4$—R$_{13}$ where m is 1 to 3, and R$_{14}$ is an alkanetetrayl of 4 to 12 carbon atoms;

Z$_1$ is a group of formula

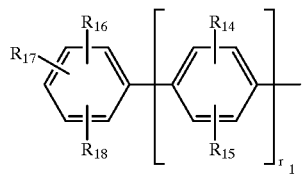

Z$_2$ is a group of formula

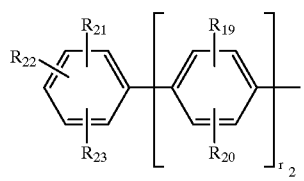

where r$_1$ and r$_2$ are independently of each other 0 or 1;

R$_{14}$, R$_{15}$, R$_{16}$, R$_{17}$, R$_{18}$, R$_{19}$, R$_{20}$, R$_{21}$, R$_{22}$ and R$_{23}$ are independently hydrogen, hydroxy, cyano, alkyl of 1 to 20 carbon atoms, alkoxy of 1 to 20 carbon atoms, phenylalkyl of 7 to 15 carbon atoms, cycloalkyl of 5 to 12 carbon atoms, cycloalkoxy of 5 to 12 carbon atoms, halogen, haloalkyl of 1 to 5 carbon atoms, sulfo, carboxy, acylamino of 2 to 12 carbon atoms, acyloxy of 2 to 12 carbon atoms, alkoxycarbonyl of 2 to 12 carbon atoms or aminocarbonyl; or R$_{17}$ and R$_{18}$ or R$_{22}$ and R$_{23}$ together with the phenyl radical to which they are attached are a cyclic radical interrupted by one to three —O— or —NR$_5$—; and with the proviso that the s-triazine of formula I, II, III, IV, V or VI exhibits enhanced durability and low loss of absorbance when exposed to actinic radiation as witnessed by an absorbance loss of less than 0.5 absorbance units after exposure for 1050 hours or less than 0.7 absorbance units after exposure for 1338 hours in a Xenon Arc Weather-Ometer.

2. A composition according to claim 1 wherein the s-triazine of component (b) is of formula I where X and Y are the same or different and are phenyl or said phenyl substituted by one to three alkyl of 1 to 6 carbon atoms, halogen, hydroxy or alkoxy of 1 to 12 carbon atoms; or Z$_1$ or Z$_2$;

R$_1$ is hydrogen, straight or branched chain alkyl of 1 to 24 carbon atoms, cycloalkyl of 5 to 12 carbon atoms, phenylalkyl of 7 to 15 carbon atoms or halogen;

R$_2$ is hydrogen, straight or branched chain alkyl of 1 to 24 carbon atoms or cycloalkyl of 5 to 12 carbon atoms; or said alkyl or said cycloalkyl substituted by one to three —R$_4$, —OR$_5$, —COOR$_5$, —OCOR$_5$ or combinations thereof; or said alkyl or cycloalkyl interrupted by one to three epoxy, —O—, —COO—, —OCO— or —CO—;

R$_4$ is aryl of 6 to 10 carbon atoms or said aryl substituted by one to three halogen, alkyl of 1 to 8 carbon atoms, alkoxy of 1 to 8 carbon atoms or combinations thereof; cycloalkyl of 5 to 12 carbon atoms; phenylalkyl of 7 to 15 carbon atoms or said phenylalkyl substituted on the phenyl ring by one to three halogen, alkyl of 1 to 8 carbon atoms, alkoxy of 1 to 8 carbon atoms or combinations thereof;

R$_5$ is defined as is R$_4$; or R$_5$ is also hydrogen or straight or branched chain alkyl of 1 to 24 carbon atoms;

Z$_1$ is a group of formula

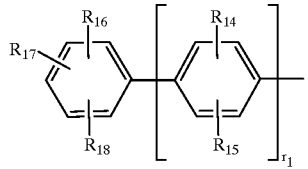

Z$_2$ is a group of formula

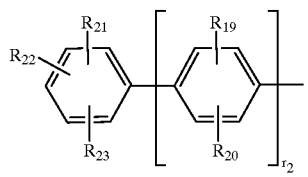

where r$_1$ and r$_2$ are each 1; and

R$_{14}$, R$_{15}$, R$_{16}$, R$_{17}$, R$_{18}$, R$_{19}$, R$_{20}$, R$_{21}$, R$_{22}$ and R$_{23}$ are independent of one another hydrogen, hydroxy, cyano, alkyl of 1 to 20 carbon atoms, alkoxy of 1 to 20 carbon atoms, phenylalkyl of 7 to 15 carbon atoms, cycloalkyl of 5 to 12 carbon atoms, cycloalkoxy of 5 to 12 carbon atoms, halogen, haloalkyl of 1 to 5 carbon atoms, sulfo, carboxy, acylamino of 2 to 12 carbon atoms, acyloxy of 2 to 12 carbon atoms, or alkoxycarbonyl of 2 to 12 carbon atoms or aminocarbonyl.

3. A composition according to claim 1 wherein the s-triazine of component (b) is of formula II where X is phenyl, naphthyl or said phenyl or said naphthyl substituted by one to three alkyl of 1 to 6 carbon atoms, by halogen, by hydroxy or by alkoxy of 1 to 6 carbon atoms or by mixtures thereof; or X is Z$_1$;

R$_1$ and R$_1$' are independently as defined for R$_1$; and

R$_2$ and R$_2$' are independently as defined for R$_2$.

4. A composition according to claim 1 wherein the s-triazine of component (b) is of formula III where R$_1$, R$_1$' and R$_1$" are independently as defined for R$_1$; and R$_2$, R$_2$' and R$_2$" are independently as defined for R$_2$.

5. A composition according to claim 1 wherein the s-triazine of component (b) is of formula VI where X and Y are independently phenyl or said phenyl substituted by one to three alkyl of 1 to 6 carbon atoms, by halogen, by hydroxy or by alkoxy of 1 to 6 carbon atoms or by mixtures thereof; or X and Y are independently Z$_1$ or Z$_2$; and L is straight or branched alkylene of 1 to 12 carbon atoms, cycloalkylene of 5 to 12 carbon atoms or alkylene substituted or interrupted by cyclohexylene or phenylene.

6. A composition according to claim 1 wherein the s-triazine of component (b) is of formula I where X and Y are the same or different and are phenyl or said phenyl substituted by one to three alkyl of 1 to 6 carbon atoms; Z$_1$ or Z$_2$;

$R_1$ is hydrogen or phenylalkyl of 7 to 15 carbon atoms;

$R_2$ is hydrogen, straight or branched chain alkyl of 1 to 18 carbon atoms; or said alkyl substituted by one to three —$R_4$, —$OR_5$ or mixtures thereof; or said alkyl interrupted by one to eight —O— or —COO—;

$R_4$ is aryl of 6 to 10 carbon atoms;

$R_5$ is hydrogen;

$Z_1$ is a group of formula

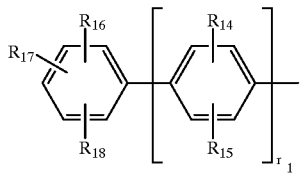

$Z_2$ is a group of formula

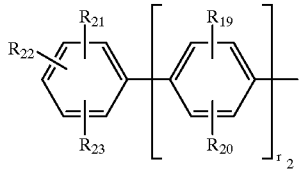

where $r_1$ and $r_2$ are each 1; and $R_{14}$, $R_{15}$, $R_{16}$, $R_{17}$, $R_{18}$, $R_{19}$, $R_{20}$, $R_{21}$, $R_{22}$ and $R_{23}$ are each hydrogen.

7. A composition according to claim 1 wherein the s-triazine UV absorber of component (b) is (1) 2,4-bis(4-biphenylyl)-6-(2-hydroxy-4-octyloxycarbonylethylideneoxyphenyl)-s-triazine;

(2) 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine;

(3) 2,4-bis(2,4-dimethylphenyl)-6-[2-hydroxy-4-(3-benzyloxy-2-hydroxypropyloxy)phenyl]-s-triazine;

(4) 2,4-bis(2-hydroxy-4-butyloxyphenyl)-6-(2,4-di-butyloxyphenyl)-s-triazine;

(5) 2,4-bis(2,4-dimethylphenyl)-6-[2-hydroxy-4-(3-nonyloxy*-2-hydroxypropyloxy)-5-α-cumylphenyl]-s-triazine; (* denotes a mixture of octyloxy, nonyloxy and decyloxy groups)

(6) methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio;

(7) 2,4,6-tris(2-hydroxy-4-isooctyloxycarbonylisopropylideneoxyphenyl)-s-triazine;

(8) 2,4-bis(2,4-dimethylphenyl)-6-(2-hydroxy-4-hexyloxy-5-α-cumylphenyl)-s-triazine;

(9) 2,4-bis(2,4-dimethylphenyl)-6-(2-hydroxy-4-octyloxyphenyl)-s-triazine, CYASORB® 1164, Cytec;

(10) 2-(2,4,6-trimethylphenyl)-4,6-bis[2-hydroxy-4-(3-butyloxy-2-hydroxypropyloxy)phenyl]-s-triazine; or

(11) 2,4,6-tris[2-hydroxy-4-(3-sec-butyloxy-2-hydroxypropyloxy)phenyl]-s-triazine.

8. A composition according to claim 7 wherein the s-triazine UV absorber of component (b) is the s-triazine UV absorber of component (b) is (1) 2,4-bis(4-biphenylyl)-6-(2-hydroxy-4-octyloxycarbonylethylideneoxyphenyl)-s-triazine;

(5) 2,4-bis(2,4-dimethylphenyl)-6-[2-hydroxy-4-(3-nonyloxy*-2-hydroxypropyloxy)-5-α-cumylphenyl]-s-triazine; (* denotes a mixture of octyloxy, nonyloxy and decyloxy groups) or (7) 2,4,6-tris(2-hydroxy-4-isooctyloxycarbonylisopropylideneoxyphenyl)-s-triazine.

9. A composition according to claim 1 wherein the effective stabilizing amount of a s-triazine of formula I, II, III, IV, V or VI is 0.1 to 20% by weight based on the adhesive.

10. A composition according to claim 1 wherein the the adhesive of component (a) is selected from the group consisting of the pressure sensitive adhesives, the rubber-based adhesives, the solvent or emulsion based adhesives, the hot melt adhesives and natural-product based adhesives.

11. A composition according to claim 1 wherein the adhesive composition is present in a laminated or multilayer construction.

12. A composition according to claim 11 wherein the laminated or multilayer construction is selected from the group consisting of (a) retroreflective sheets and signs and conformable marketing sheets;

(b) solar control films of various construction;

(c) corrosion resistant silver mirrors and solar reflectors;

(d) reflective print labels;

(e) UV absorbing glasses and glass coatings;

(f) electrochromic devices;

(g) films/glazings;

(h) windscreens and intermediate layers; and (I) optical films.

13. A composition according to claim 12 wherein the laminated or multilayer construction is selected from the group consisting of (a) retroreflective sheets and signs and conformable marketing sheets;

(b) solar control films of various construction;

(e) UV absorbing glasses and glass coatings;

(g) films/glazings; and (h) windscreens and intermediate layers.

14. A composition according to claim 13 wherein the laminated or multilayer construction is selected from the group consisting of (b) a solar control films of various construction; and (h) windscreens and intermediate layers.

15. A composition according to claim 1 wherein the adhesive of component (a) is a resin selected from the group consisting of (i) polyurethanes;

(ii) polyacrylics;

(iii) epoxys;

(iv) phenolics;

(v) polyimides;

(vi) poly(vinyl butyral);

(vii) polycyanoacrylates;

(viii) polyacrylates;

(ix) ethylene/acrylic acid copolymers and their salts (ionomers);

(x) silicon polymers;

(xi) poly(ethylene/vinyl acetate);

(xii) atatic polypropylene;

(xiii) styrene-diene copolymers;
(xiv) polyamides;
(xv) hydroxyl-terminated polybutadiene;
(xvi) polychloroprene;
(xvii) poly(vinyl acetate);
(xviii) carboxylated styrene/butadiene copolymers;
(xix) poly(vinyl alcohol); and
(xx) polyesters.

16. A composition according to claim 1 wherein the adhesive is a resin selected from the group consisting of the polyurethanes, acrylics, epoxy resins, phenolics, polyimides, poly(vinyl butyral), polyolefins, polyacrylates, thermosets, vinyl polymers, styrene polymers and cyanoacrylates.

17. A composition according to claim 1 wherein the adhesive of component (a) is a resin selection from the group consisting of poly(vinyl butyral), ethylene/vinyl acetate copolymers, polyacrylics, polyacrylates, natural rubber, polycyanoacrylates, poly(vinyl alcohol), styrene/butadiene rubber, phenolics, urea-formaldehyde polymers, epoxy resins, vinyl polymers, polyurethanes and styrene block copolymers.

18. A composition according to claim 17 wherein the adhesive of component (a) is a resin selected from the group consisting of poly(vinyl butyral), ethylene/vinyl acetate copolymers, polyacrylics, polyacrylates, natural rubber, polycyanoacrylates, poly(vinyl alcohol), styrene/butadiene rubber, phenolics, vinyl polymers, polyurethanes and styrene block copolymers.

19. A composition according to claim 18 wherein the adhesive of component (a) is a polyacrylate.

20. A composition according to claim 1 which additionally contains from 0.01 to 10% by weight based on the adhesive of a coadditive which is selected from the group consisting of the antioxidants, other UV absorbers, hindered amines, phosphites or phosphonites, hydroxylamines, nitrones, benzofuran-2-ones, thiosynergists, polyamide stabilizers, metal stearates, nucleating agents, fillers, reinforcing agents, lubricants, emulsifiers, dyes, pigments, optical brighteners, flame retardants, antistatic agents and blowing agents.

21. A composition according to claim 20 wherein the amount of coadditive is from 0.025 to 5% by weight based on the adhesive.

22. A composition according to claim 21 wherein the amount of coadditive is from 0.1 to 3% by weight based on the adhesive.

23. A composition according to claim 1 wherein the optional coadditives are selected from the group consisting of plasticizers, adhesion promoters, waxes, petroleum waxes, elastomers, tackifier resins, oils, resins, polymers, rosin, modified rosin or rosin derivatives, hydrocarbon resins, terpene resins, paraffin wax, microcrystalline wax, synthetic hard wax and/or polyethylene wax.

* * * * *